United States Patent
Inoue et al.

(10) Patent No.: US 8,531,452 B2
(45) Date of Patent: Sep. 10, 2013

(54) VIDEO GAME MACHINE, GAMING IMAGE DISPLAY CONTROL METHOD AND DISPLAY MODE SWITCHING CONTROL METHOD

(75) Inventors: Yoshihisa Inoue, Tokyo (JP); Masahiro Moriyama, Tokyo (JP); Masakazu Shibamiya, Tokyo (JP); Satoshi Uchiyama, Tokyo (JP); Taichi Takeuchi, Tokyo (JP); Yoshitaka Adachi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 639 days.

(21) Appl. No.: 12/804,340

(22) Filed: Jul. 20, 2010

(65) Prior Publication Data

US 2011/0018868 A1    Jan. 27, 2011

(30) Foreign Application Priority Data

Jul. 21, 2009 (JP) ................................. 2009-170649
Jul. 21, 2009 (JP) ................................. 2009-170650
Jul. 21, 2009 (JP) ................................. 2009-170651

(51) Int. Cl.
*G06T 15/00* (2011.01)

(52) U.S. Cl.
USPC ............................................... 345/419

(58) Field of Classification Search
USPC ........................................... 345/419
See application file for complete search history.

(56) References Cited

U.S. PATENT DOCUMENTS

| | | | |
|---|---|---|---|
| 6,204,876 B1 | 3/2001 | Uomori et al. | |
| 7,079,174 B2 | 7/2006 | Taniguchi et al. | |
| 7,193,629 B2 | 3/2007 | Kake et al. | |
| 7,371,163 B1 * | 5/2008 | Best | 463/1 |
| 7,463,257 B2 * | 12/2008 | Martin | 345/419 |
| 2004/0058715 A1 | 3/2004 | Taniguchi et al. | |

FOREIGN PATENT DOCUMENTS

| | | |
|---|---|---|
| EP | 0 817 125 | 6/1997 |
| EP | 0 817 125 | 5/1999 |
| JP | 9-192349 | 7/1997 |
| JP | 10-074269 | 3/1998 |
| JP | 2003-058912 | 2/2003 |
| JP | 2003-107603 | * 4/2003 |
| JP | 2003-167216 | 6/2003 |
| JP | 2003-284094 | 10/2003 |
| JP | 2004-120058 | 4/2004 |
| JP | 2007-037619 | 2/2007 |
| JP | 2007-050147 | 3/2007 |
| JP | 3973525 | 9/2007 |
| JP | 2008-153805 | 7/2008 |
| JP | 2008-242664 | 10/2008 |
| JP | 2009-064356 | 3/2009 |

* cited by examiner

*Primary Examiner* — Kee M Tung
*Assistant Examiner* — Richard M Russell
(74) *Attorney, Agent, or Firm* — Jordan and Hamburg LLP

(57) ABSTRACT

A video game machine includes a monitor which permits three-dimensional viewing, a virtual camera controller which selectively provides on-screen presentation in 2D display mode in which two virtual cameras for capturing images are matched with each other and in 3D display mode in which the two virtual cameras are set to achieve a prescribed distance therebetween, an image display controller which generates a 3D image presented on the monitor from image data acquired by the two virtual cameras, a display mode switching processor which repositions the two virtual cameras from the positional relationship in one display mode to the positional relationship in the other in a stepwise fashion. Switching between the 2D and 3D display modes is smoothened and stimulation of a player's eyes or brain caused by a sudden change between states with or without stereoscopic effect is suppressed.

20 Claims, 28 Drawing Sheets

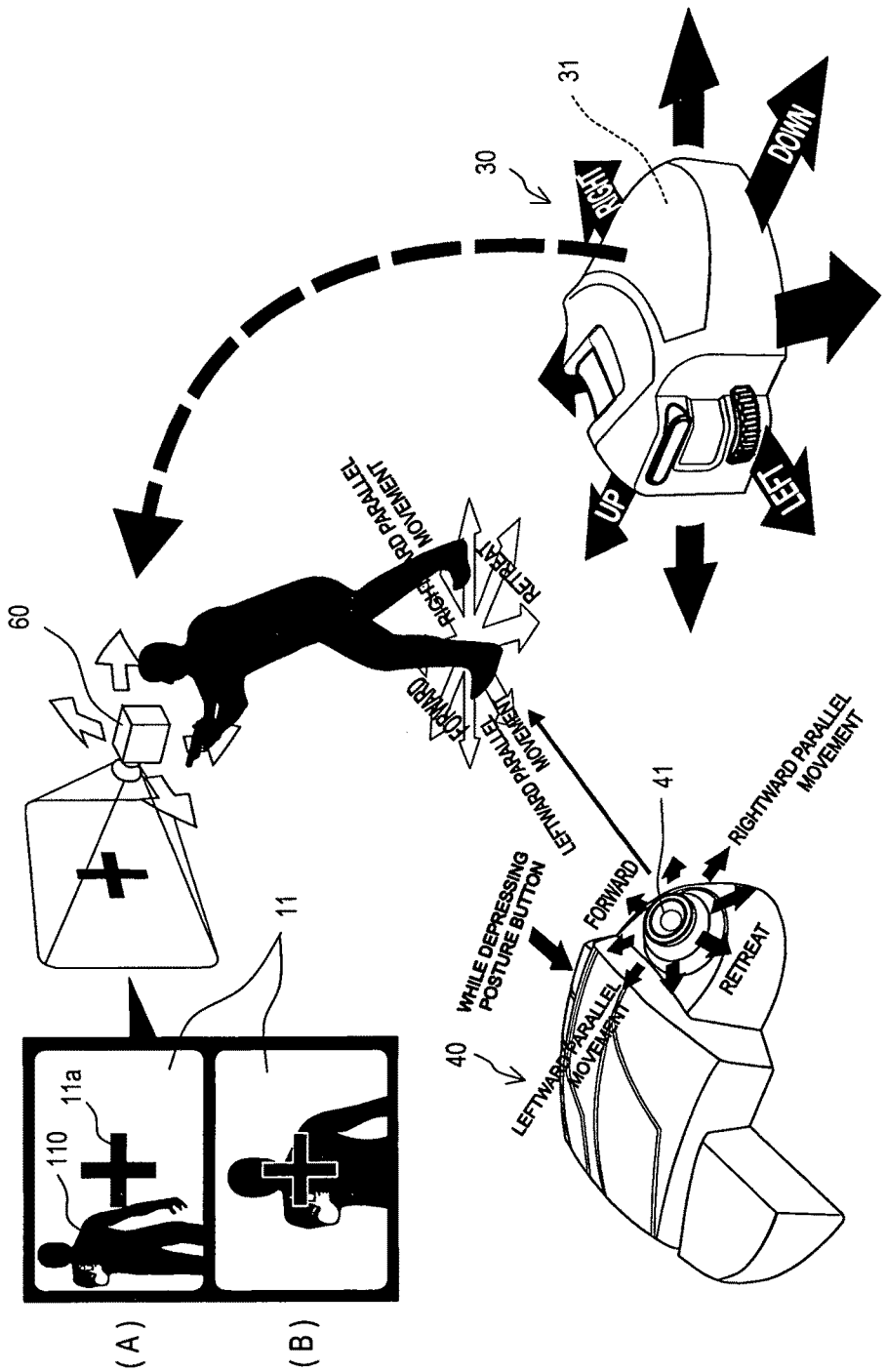

FIG.18A
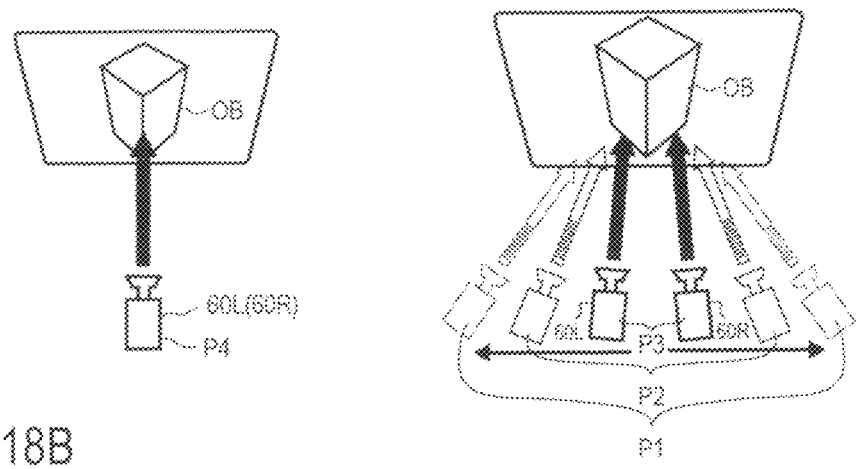
FIG.18B
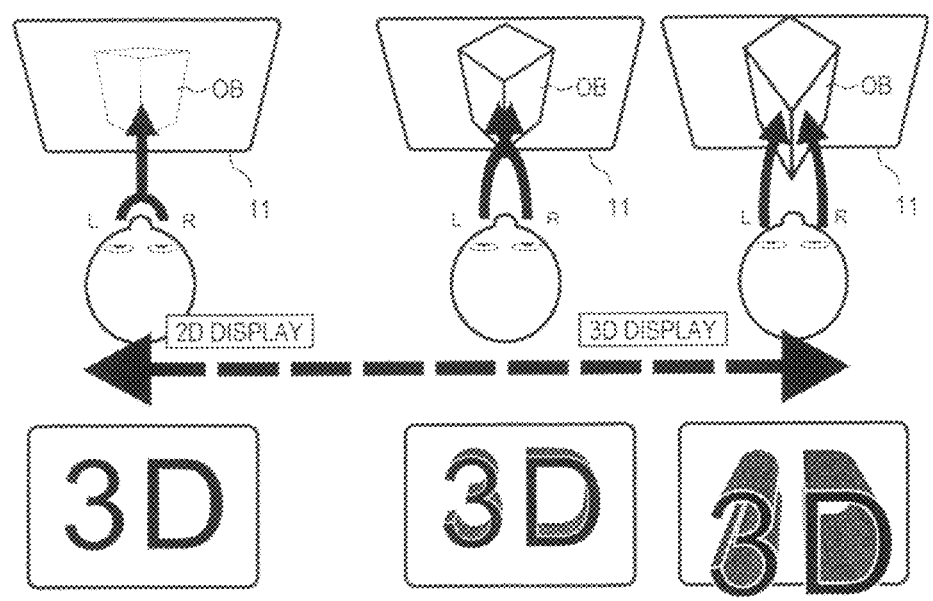
FIG.18C

VIDEO GAME MACHINE, GAMING IMAGE DISPLAY CONTROL METHOD AND DISPLAY MODE SWITCHING CONTROL METHOD

CROSS REFERENCE

This Nonprovisional application claims priority under 35 U.S.C. §119(a) on Patent Application No. 2009-170650, No. 2009-170649 and 2009-170651 filed in Japan on Jul. 21, 2009 respectively, the entire contents of which are hereby incorporated by reference.

BACKGROUND OF THE INVENTION

The present invention relates to a video game machine, a gaming image display control method and a display mode switching control method which make it possible to switch between two-dimensional (2D) and three-dimensional (3D, or stereoscopic) presentations to selectively provide a 2D or 3D on-screen gaming image.

Conventionally, various techniques for presenting a 3D image on a display screen have been proposed. Parallax barrier systems are a commonly known approach to 3D image presentation. 3D display technology includes so-called glass-type display methods that uses a combination of a polarizer or a liquid crystal display (LCD) shutter and viewing glasses as well as parallax panoramagram and lenticular systems which are particularly well-known examples of glasses-free display methods. A technique proposed in recent years is related to a new display method that will make it possible to switch between 2D and 3D image displays. Specifically, Japanese Patent No. 3973525 describes a mobile telephone having an LCD panel monitor with a parallax barrier system implemented therein. A portable personal computer and the mobile telephone described in Japanese Patent No. 3973525 are structured such that a barrier built in the LCD panel is deactivated when a 2D display is selected whereas the LCD panel barrier is activated when a 3D display is selected and, in the latter case, a 3D image including left- and right-eye images generated based on image data received from an external storage medium through a network is led to a monitor screen for displaying the 3D image thereon.

An apparatus described in Japanese Patent No. 3973525 requires image data for 3D image presentation received by a special mobile telephone, the image data including specially prepared 3D image data contents obtained from a website or an e-mail. Additionally, although the above-cited Japanese Patent mentions that the apparatus incorporates a processor which can convert an already available 2D image into 3D image data for stereoscopic viewing, it is only possible to obtain a "simulated" 3D image. Moreover, this Japanese Patent describes only such am arrangement that makes it possible to acquire 3D image data from an external source or to generate a simulated 3D image from a 2D image but contains no mention of a relationship between locations of two cameras. In particular, this Japanese Patent does not propose any arrangement for solving problems associated with switching between 2D and 3D presentations.

SUMMARY OF THE INVENTION

It is a first object of the present invention to provide a video game machine and a gaming image display control method therefor that selectively provide a 2D or 3D presentation based on gaming images for left and right eyes obtained with a pair of virtual cameras capable of moving in a virtual game space in accordance with manipulation of an operating member by a player.

It is a second object of the present invention to provide a video game machine and a display mode switching control method therefor that smoothen switching between 2D and 3D presentations by varying a relationship between the locations of two virtual cameras in a stepwise fashion to suppress stimulation of a player's eyes and stimulation of the player's brain caused by sudden changes from a state in which the player observes an image with no stereoscopic effect to a state in which the player observes an image with a stereoscopic effect, and vice versa.

To achieve the aforementioned first object of the invention, a video game machine is configured to present a player with an image captured by at least one virtual camera within a view angle in a viewing direction thereof, the at least one virtual camera forming a combination of first and second virtual cameras having a capability to move within a virtual game space in accordance with manipulation of an operating member by the player. This video game machine comprises a monitor having a display screen on which a parallax barrier member that permits three-dimensional viewing is provided, a virtual camera controller for selectively providing on-screen presentation in 2D display mode in which positions and viewing directions of the first and second virtual cameras for capturing images in the virtual game space are matched with each other and in 3D display mode in which the first and second virtual cameras are set at different positions with a prescribed relationship therebetween and with prescribed viewing directions intersecting each other in the virtual game space, first and second image storage blocks for temporarily storing first and second image data acquired by the first and second virtual cameras, respectively, a display mode specifier for selectively specifying one of the 2D and 3D display modes, and an image display controller for generating an image for 3D display by using the image data obtained from the first and second image storage blocks one line after another and then outputting the image thus generated to the monitor.

To achieve also the aforementioned first object of the invention, a gaming image display control method is for a video game machine which includes a monitor having a display screen on which a parallax barrier member that permits three-dimensional viewing is provided, the video game machine being configured to present on the monitor a gaming image captured by at least one virtual camera within a view angle in a viewing direction thereof, wherein the at least one virtual camera forms a combination of first and second virtual cameras having a capability to move within a virtual game space in accordance with manipulation of an operating member by the player. This gaming image display control method comprises a display mode specifying step of selectively specifying one of 2D display mode and 3D display mode, a virtual camera control step of selectively providing on-screen presentation in the 2D display mode in which positions and viewing directions of the first and second virtual cameras for capturing images in the virtual game space are matched with each other and in the 3D display mode in which the first and second virtual cameras are set at different positions with a prescribed relationship therebetween and with prescribed viewing directions intersecting each other in the virtual game space according to a command given in the display mode specifying step, a step of temporarily storing first and second image data acquired by the first and second virtual cameras in first and second image storage blocks, respectively, and an image display control step of generating an image for 3D display by using the image data obtained from the first and second image storage blocks one line after another and then outputting the image thus generated to the monitor according to the command given in the display mode specifying step.

According to the above-described features of the invention intended to achieve the first object thereof, each of the virtual cameras moves within the virtual game space in accordance with manipulation of the operating member by the player. The gaming image captured by each virtual camera within the view angle in the viewing direction thereof is presented on the monitor for the player, enabling the player to manipulate the operating member while observing the on-screen gaming image. Since the parallax barrier member that permits three-dimensional viewing is provided on the display screen of the monitor, the player is allowed to play a game with fun while observing the gaming image presented on the monitor with a stereoscopic effect. While the game is in progress, the virtual camera controller makes it possible to provide the on-screen presentation selectively in the 2D display mode in which the positions and viewing directions of the first and second virtual cameras are matched with each other in the virtual game space and in the 3D display mode in which the first and second virtual cameras are set at different positions with a prescribed relationship therebetween and with prescribed viewing directions intersecting each other in the virtual game space. The first and second virtual cameras may each have the same number of pixels as the monitor for capturing the gaming image. The first and second image data acquired by the first and second virtual cameras are temporarily written in the first and second image storage blocks, respectively. Meanwhile, the 2D and 3D display modes are selectively specified by the aforementioned display mode specifier. When one of the 2D and 3D display modes is specified according to a command given to the display mode specifier, the image display controller selectively generates an image for 2D display or an image for 3D display by using the image data obtained from the first and second image storage blocks one line after another and outputs the image thus generated to the monitor. An image for 2D display or 3D display is selectively generated based on gaming images for left and right eyes captured by the two virtual cameras and presented for the player according to his or her choice by preference, thus providing the player with a gaming image featuring great reality depending on situations in the game.

To achieve the aforementioned second object of the invention, a video game machine is configured to present a player with a gaming image captured by at least one virtual camera within a view angle in a viewing direction thereof, the at least one virtual camera forming a combination of first and second virtual cameras having a capability to move within a virtual game space in accordance with manipulation of an operating member by the player. This video game machine comprises a monitor having a display screen on which a parallax barrier member that permits three-dimensional viewing is provided, a virtual camera controller for selectively providing on-screen presentation in 2D display mode with a positional relationship in which positions and viewing directions of the first and second virtual cameras for capturing images in the virtual game space are matched with each other and in 3D display mode in which the first and second virtual cameras are set to achieve a positional relationship with a prescribed distance therebetween in the virtual game space, an image display controller for temporarily storing first and second image data acquired by the first and second virtual cameras in first and second image storage blocks, respectively, generating the gaming image captured by the first and second virtual cameras by using the image data obtained from the first and second image storage blocks one line after another and then outputting the gaming image thus generated to the monitor, a display mode specifier for selectively specifying one of the 2D and 3D display modes, and a display mode switching processor for repositioning the first and second virtual cameras from positions satisfying the positional relationship in one of the display modes to positions satisfying the positional relationship in the other of the display modes in a stepwise fashion according to a command given by the display mode specifier.

To achieve also the aforementioned second object of the invention, a gaming image display control method is for a video game machine which includes a monitor having a display screen on which a parallax barrier member that permits three-dimensional viewing is provided, the video game machine being configured to present on the monitor a gaming image captured by at least one virtual camera within a view angle in a viewing direction thereof, wherein the at least one virtual camera forms a combination of first and second virtual cameras having a capability to move within a virtual game space in accordance with manipulation of an operating member by the player. This gaming image display control method comprises a virtual camera control step of selectively providing on-screen presentation in 2D display mode with a positional relationship in which positions and viewing directions of the first and second virtual cameras for capturing images in the virtual game space are matched with each other and in 3D display mode in which the first and second virtual cameras are set to achieve a positional relationship with a prescribed distance therebetween in the virtual game space, an image display control step of temporarily storing first and second image data acquired by the first and second virtual cameras in first and second image storage blocks, respectively, generating the gaming image captured by the first and second virtual cameras by using the image data obtained from the first and second image storage blocks one line after another and then outputting the gaming image thus generated to the monitor, a display mode specifying step of selectively specifying one of the 2D and 3D display modes, and a display mode switching processing step of repositioning the first and second virtual cameras from positions satisfying the positional relationship in one of the display modes to positions satisfying the positional relationship in the other of the display modes in a stepwise fashion according to a command given in the display mode specifying step.

According to the above-described features of the invention intended to achieve the second object thereof, the parallax barrier member that permits three-dimensional viewing is provided on the display screen of the monitor and this allows the player to observe the gaming image with three-dimensional reality. Each of the virtual cameras moves within the virtual game space in accordance with manipulation of the operating member by the player. The gaming image captured by each virtual camera within the view angle in the viewing direction thereof is presented on the monitor for the player, enabling the player to manipulate the operating member while observing the on-screen gaming image. While the game is in progress, the virtual camera controller makes it possible to provide the on-screen presentation selectively in the 2D display mode with a positional relationship in which the positions and viewing directions of the first and second virtual cameras for capturing images in the virtual game space are matched with each other and in the 3D display mode in which the first and second virtual cameras are set to achieve a positional relationship with a prescribed distance therebetween in the virtual game space in accordance with manipulation of the operating member by the player. Consequently, the image display controller temporarily stores the first and second image data acquired by the first and second virtual cameras in the first and second image storage blocks, respectively, generates the gaming image captured by the first and second virtual cameras by using pixel data obtained from the first and second image storage blocks one line after another and then outputs the gaming image thus generated to the monitor.

When the display mode specifier selectively specifies one of the 2D and 3D display modes, the display mode switching processor repositions the first and second virtual cameras from positions satisfying the positional relationship in one of the display modes to positions satisfying the positional relationship in the other of the display modes in a stepwise fashion. Therefore, the video game machine is shifted from one display mode to the other as a result of stepwise repositioning of the first and second virtual cameras accomplished by cooperative operation of the virtual camera controller and the image display controller. The display mode is switched in a stepwise fashion as mentioned above, and this serves to suppress stimulation of the player's brain caused by sudden changes from a state in which the on-screen gaming image produces no stereoscopic effect to a state in which the on-screen gaming image produces a stereoscopic effect, and vice versa.

These and other objects, features and advantages of the invention will become more apparent upon a reading of the following detailed description in conjunction with the accompanying drawings.

BRIEF DESCRIPTION OF THE DRAWINGS

FIG. 8 is a diagram for explaining a state in which the player's own character has assumed an attacking posture;

FIGS. 18A, 18B and 18C are diagrams for explaining stepwise changes between 2D and 3D display modes, FIG. 18A depicting relative positional relationships, or distances, between the two virtual cameras, FIG. 18B depicting differences in the level of depth perception by a viewing player, and FIG. 18C depicting images that provide different levels of depth perception;

DETAILED DESCRIPTION OF THE INVENTION

Figure 1:
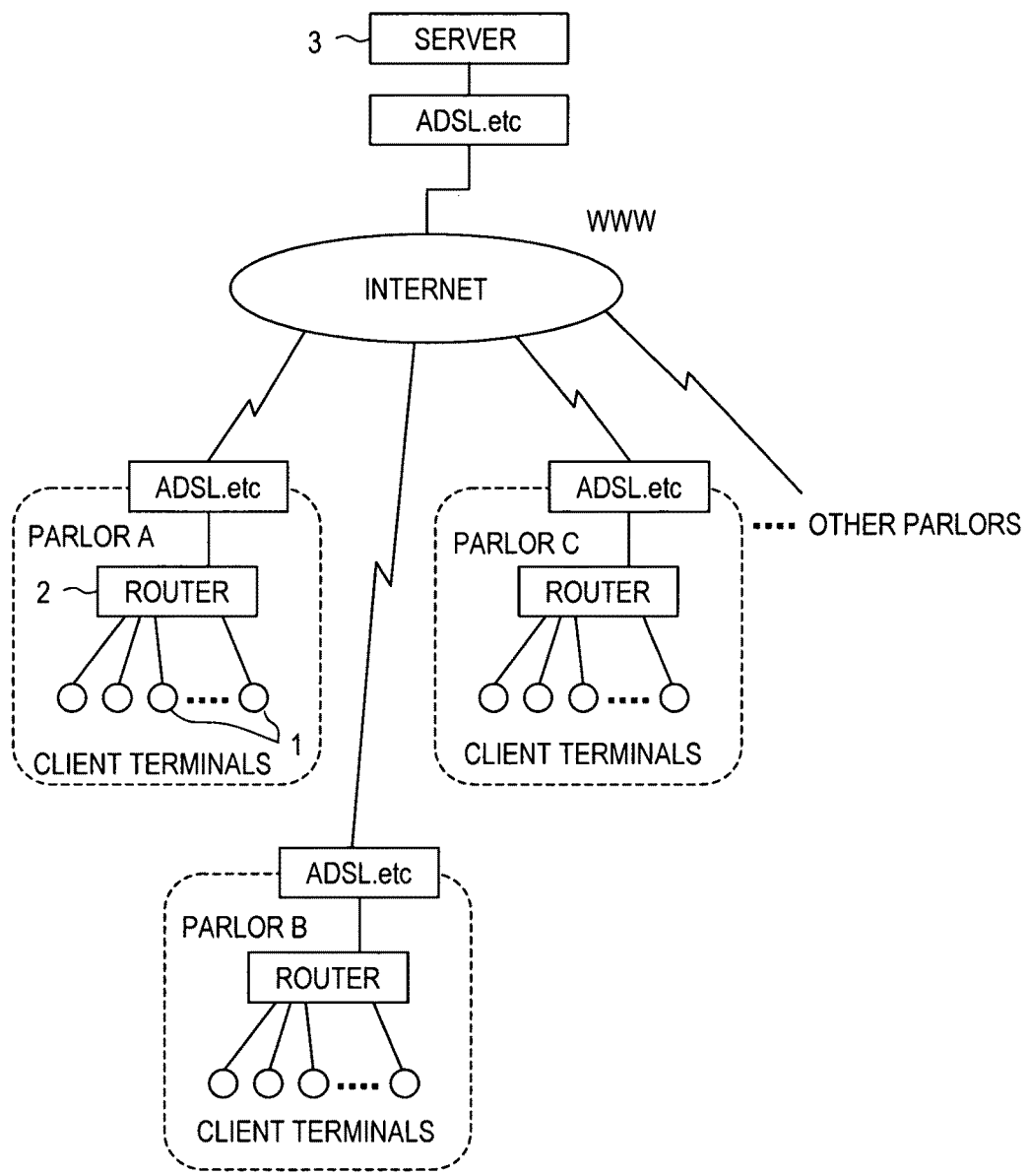
FIG. 1 is a general configuration diagram of a game system according to an embodiment of the invention.

FIG. 1 is a configuration diagram of a competitive game system employing video game machines according to an embodiment of the present invention. The competitive game system comprises a plurality of (8 in this embodiment) client terminal apparatuses (gaming terminals) 1 to which identification information is individually assigned, routers 2 each of which is a communications device communicatably connected to the individual gaming terminals 1 provided in one arcade game parlor and to gaming terminals 1 provided in other arcade game parlors to enable communication therebetween over a network (i.e., the Internet), and a server 3 communicatably connected to the individual gaming terminals 1 through the routers 2 for managing information concerning player authentication, player selection and game histories that allow a plurality of players to play at the respective gaming terminals 1.

Each of the gaming terminals 1 allows a player to proceed with a game by performing prescribed operations while watching a game screen presented on a monitor 11. The identification information assigned to each of the gaming terminals 1 includes identification information assigned to the router 2 to which the gaming terminals 1 are connected (or identification information assigned to an arcade game parlor where the gaming terminals 1 are located) and identification information (i.e., a terminal number) assigned to each of the gaming terminals 1 located in the arcade game parlor. For example, if the identification information assigned to arcade game parlor A is "A" and the identification information assigned to a particular gaming terminal 1 in arcade game parlor A is "4", then the identification information given to that gaming terminal 1 is "A4".

Each of the routers 2 is communicatably connected to the plurality of gaming terminals 1 provided in one arcade game parlor and to the server 3 to permit transmission and reception of data between the gaming terminals 1 and the server 3.

The server 3 which is communicatably connected to each of the routers 2 stores player information in association with user identification codes (user IDs) used for identifying individual players and serves to select players (opponents) who will play a game in a common game space with a primary player at any one of the gaming terminals 1 by transmitting and receiving data to and from the gaming terminals 1 through the respective routers 2.

Figure 2:
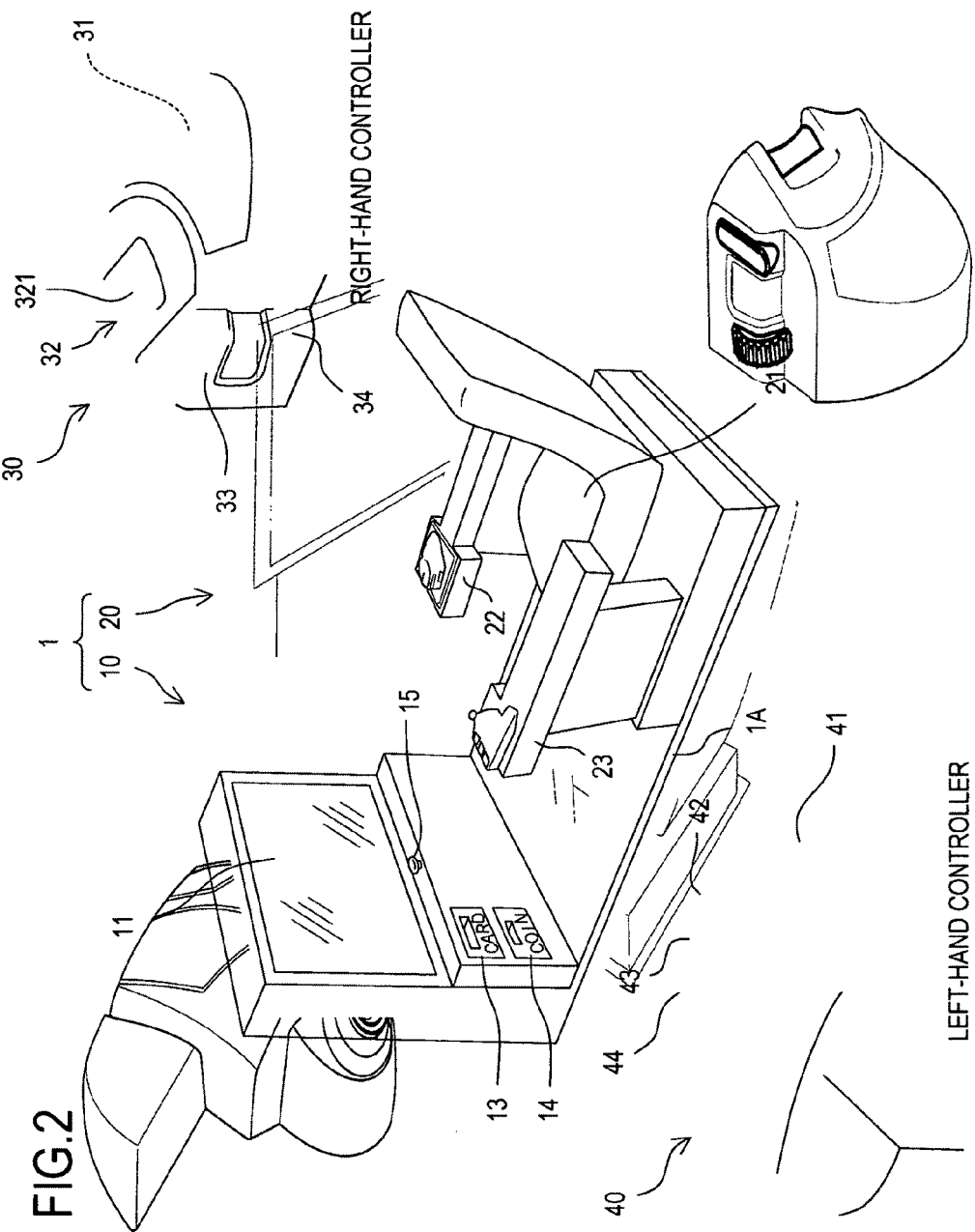
FIG. 2 is a perspective diagram illustrating the external appearance of a gaming terminal according to the embodiment.

FIG. 2 is a perspective diagram illustrating the external appearance of one of the gaming terminals 1 according to the embodiment. In the following discussion of the present embodiment, it is assumed that each competitive game played by use of the gaming terminals 1 is a simulated shooting game. The gaming terminals 1 are configured to allow a choice of single (one-to-one) fighting mode and group fighting mode. In the group fighting mode, each game is played by specified numbers of friend and foe players (e.g., 4 players on each side). In either of the single fighting mode and the group fighting mode, each gaming terminal 1 exchanges data concerning operations performed by the individual players with the other gaming terminals 1 through a later-described network communication section 18 and the router 2.

The gaming terminal 1 has a monitor section 10, a controller section 20 located in front of the monitor section 10 and a mat member 1A joining the monitor section 10 and the controller section 20 to each other. The monitor section 10 includes the aforementioned monitor 11 which is made of an LCD display, a plasma display or the like for presenting a gaming image, a card reader 13 that reads contents of a user card, a coin input section 14 that accepts coins (gaming fee) placed therein and a setter 15 (which may be a pushbutton switch, for example) that is used for selecting a desired display mode as will be discussed later. The aforementioned user card is a magnetic card or an integrated circuit (IC) card storing player identification information in the form of a user ID. Although not illustrated in FIG. 2, the gaming terminal 1 is also provided with a speaker 12 for producing sound effects in the event of the player's offensive action (e.g., shooting), for instance.

The controller section 20 of this embodiment includes a chair-like seat 21 provided with a right-hand armrest 22 and a left-hand armrest 23. The right-hand armrest 22 and the left-hand armrest 23 have at forwardmost ends thereof a first control pad 30 and a second control pad 40, respectively, each having a comfortably grippable size. More specifically, upper forwardmost portions of the right-hand armrest 22 and the left-hand armrest 23 are shaped to form flat surfaces, and the first and second control pads 30, 40 are disposed on the respective upper flat surfaces.

The first control pad 30 includes a built-in optical mouse 31 on the bottom of the first control pad 30, a trigger button 32 on an upper surface, an attitude changing button 33 at an upper part of a side surface and a jog dial 34 just below the posture changing button 33, wherein the trigger button 32 and the posture changing button 33 serve as pushbutton switches. The optical mouse 31 has a conventionally known structure and functions as a sliding distance detector. Specifically, the first control pad 30 incorporates a light emitter for projecting illuminating light to the exterior through an illuminating aperture formed in part of a bottom plate of the first control pad 30 and an imaging device for imaging the exterior upon receiving light reflected therefrom. The first control pad 30 determines the amount of movement thereof by sensing a change in an external image picked up by the imaging device. The upper forwardmost portion of the right-hand armrest 22 is formed to have a prescribed surface roughness so that the change in the image picked up by the imaging device can be properly detected. The optical mouse 31 is configured to have the capability to measure sliding distances in front, rear, left and right directions when the first control pad 30 is slid along the upper surface of the right-hand armrest 22.

When a movable part 321 of the trigger button 32 is depressed inward, an unillustrated internal movable metal piece thereof goes into contact with an unillustrated stationary metal piece and generates an electrical signal which is used for sensing the player's depression of (clicking on) the trigger button 32. Such a mouse click by the player serves to enter a command for a shooting action to be performed by his or her own character presented on a display screen of the monitor 11.

The posture changing button 33 has a structure that is swingable in a horizontal plane with one end of the posture changing button 33 biased to stick outward. Each time this outwardly sticking end of the posture changing button 33 is depressed against a biasing force, the player's character is caused to assume a squatting position. The jog dial 34 is used for setting the panning rate of two virtual cameras 60. Each virtual camera 60 is caused to pan at a speed corresponding to the amount of rotation of the jog dial 34.

The second control pad 40 includes a joystick 41 used for entering a command for moving the player's own character, a posture button 42, an item button 43 and an action button 44, the item button 43 and the action button 44 being pushbutton switches located at an outer front part of the second control pad 40. The individual buttons 42, 43, 44 have essentially the same mechanical structure as the above-described trigger button 32. The joystick 41 has a conventionally known structure provided with a control stick tiltable in any desired direction in a horizontal plane and is configured to transmit a signal indicative of the direction and angle of tilt of the control stick. The signal indicative of the tilt direction and tilt angle of the control stick is for entering a command for moving the player's own character in a virtual game space presented on the display screen of the monitor 11, the tilt angle specifying a moving speed of the character and the tilt direction specifying a moving direction thereof. While the moving direction of the player's own character may be one of directions throughout 360 degrees, the moving direction is set to fall within specific limited ranges of directions including front, rear, left and right directions for reasons related to signal processing. For example, there are 8 ranges of directions within which the moving direction of the character should fall. The present embodiment may be modified to employ an arrangement in which the player's own character alternately stops and moves or, alternatively, an arrangement in which the character's moving speed is set in prescribed discrete steps (e.g., two steps) regardless of the tilt angle of the joystick 41 that is originally intended to specify the moving speed.

The posture button 42 functions as a ready-to-attack command input member. When depressed by the player, the posture button 42 enters a command for initiating a preparatory operation in which one of weapons possessed by the player's own character is prepared ready to perform an intended function. The item button 43 is for selecting a desired one of a plurality of predefined items (simulated weapons in this embodiment). Successive depressions of the item button 43 allow the player to cyclically select one item after another. The items prepared for selection by the player will include simulated weapons appropriate for playing the competitive game, such as virtual guns like a rifle and a handgun, other kinds of hand-operated weapons like a knife and a hand grenade, etc. When a desired item (simulated weapon) is specified by the player, the player's own character will hold the weapon in the form of a virtual image in one hand as presented on the display screen of, the monitor 11. The action button 44 functions as an "Action!" command input member that is used for initiating a martial art combat at close range (infighting), for example.

At an appropriate location inside the gaming terminal 1, there is provided a control section 16 (refer to FIG. 3) including a microcomputer or the like which receives sensing signals and outputs control signals to individual parts.

Figure 3:
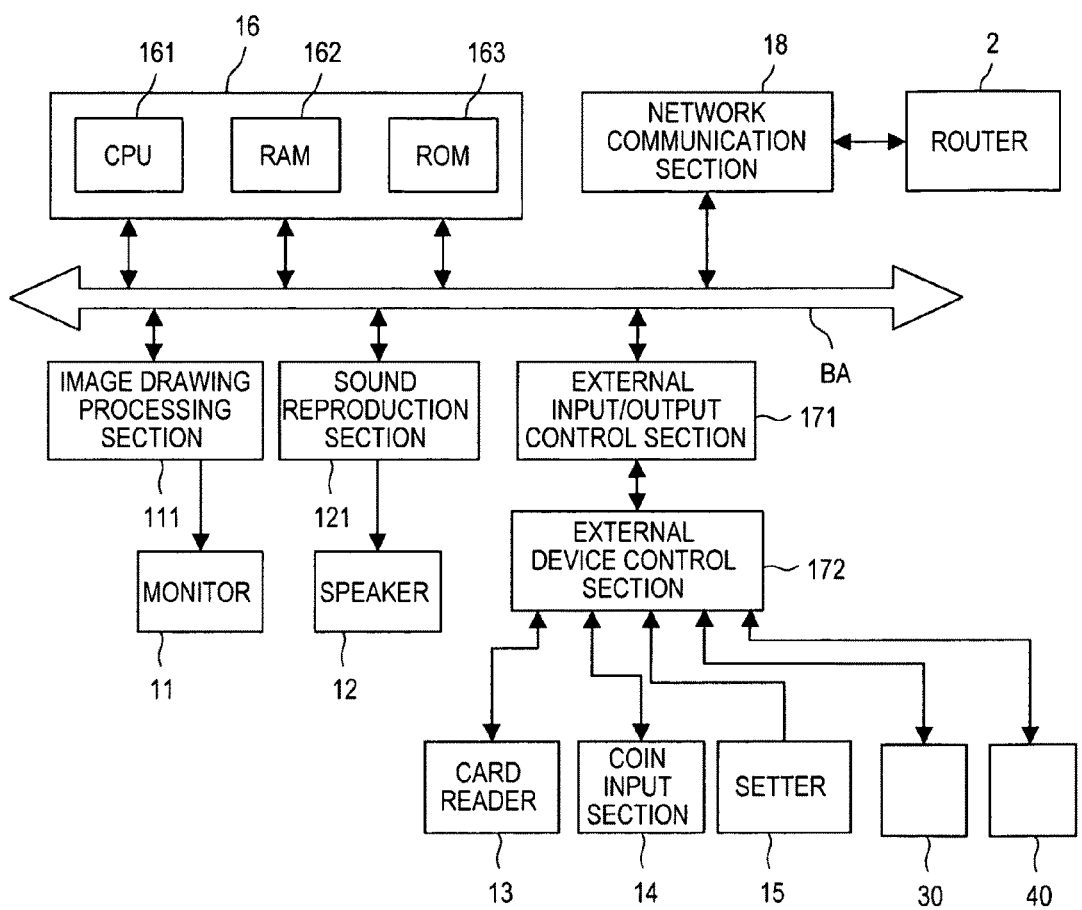
FIG. 3 is a hardware configuration diagram of the gaming terminal according to the embodiment.

FIG. 3 is a hardware configuration diagram of the gaming terminal 1 according to the present embodiment. The control section 16 which performs overall control of the gaming terminal 1 includes a CPU 161 serving as an information processor for carrying out operations related to the progress of each game, an image display operation and various other information processing operations, a random access memory (RAM) 162 for temporarily storing in-process information, for instance, and a read-only memory (ROM) 163 in which prescribed image information and a game program, for instance, are stored in advance.

Referring to FIG. 3, an external input/output control section 171 converts the sensing signals input from a sensing section including such devices as the card reader 13 and the coin input section 14 into digital signals which can be processed by the control section 16. The external input/output control section 171 also converts command information into control signals and outputs the control signals to the respective devices of the sensing section. The external input/output control section 171 is configured to perform such signal processing and input/output operations in a time-divisional fashion, for example. Additionally, the external input/output control section 171 transmits command information corresponding to individual operations on the setter 15 and the first and second control pads 30, 40 to the control section 16. An external device control section 172 performs operations for outputting the control signals to the individual devices of the sensing section and inputting the sensing signals from the individual devices of the sensing section during time slots respectively allocated in a time division scheme.

An image drawing processing section 111 including a video RAM and the like serves to draw and present a prescribed image on the monitor 11 according to an image display command fed from the control section 16. A sound reproduction section 121 serves to create prescribed audible messages and/or background music, for instance, and output the same to the speaker 12 according to a command fed from the control section 16.

The ROM 163 stores such image elements as specified numbers of friend and foe characters (e.g., 4 characters on each side), predefined items (simulated weapons), background images and various kinds of screen image elements, for example. Each of the image elements is constructed of a specified number of polygons so that these image elements can be drawn three-dimensionally. According to an image drawing command fed from the CPU 161, the image drawing processing section 111 performs such mathematical operations as conversion from a world coordinate system defined in a three-dimensional space (virtual game space) to a local coordinate system referenced to the position of the virtual camera pair 60, calculation for converting positions in the local coordinate system into positions in a virtual three-dimensional space, and calculation for defining a light source location. The image drawing processing section 111 further performs operations for writing image data used for drawing the image elements in the video RAM, such as an operation for writing (pasting) texture data in an area of the video RAM defined by polygons, for example, based on the results of the aforementioned calculations. Image elements prepared for use in a background may include various kinds of objects which are suited for applications in a shooting game, such as ruined factories, outdoor scenes (e.g., buildings and streets in urban areas, in-forest scenes), and the like.

Now, a relationship between the working of the CPU 161 and the working of the image drawing processing section 111 is discussed. The CPU 161 reads out image, sound and control program data as well as game program data prepared according to a predefined game rule from the ROM 163 under the control of an operating system (OS) recorded in the ROM 163 which may be of a built-in or removable type that can be removed from and inserted into an image display processing section for outputting the image information and displaying the same on the monitor 11. Part or all of the image, sound and control program data thus read is held in the RAM 162. Thereafter, the CPU 161 performs processing operations according to a control program held in the RAM 162, various kinds of data (i.e., the image data including data on polygons representing objects displayed on-screen, a texture and character data as well as the sound data) and the sensing signals fed from the sensing section.

Among various kinds of data stored in the ROM 163, data stored in a removable storage medium may be made readable by such a drive as a hard disk drive, an optical disc drive, a flexible disk drive, a silicon disk drive or a cassette medium reading device, for example. In this case, a suitable storage medium is a hard disk, an optical disc, a flexible disk, a compact disc (CD), a digital versatile disc (DVD) or a semiconductor memory, for example.

The aforementioned network communication section 18 of the gaming terminal 1 performs transmission and reception of operational information occurring during execution of a shooting game concerning operations performed by the primary player playing at the gaming terminal 1 to and from the other gaming terminals 1 operated by the friend and foe players through the respective routers 2, and through the network. The network communication section 18 also performs transmission and reception of information obtained in a process of accepting a new player and game scoring information available at a point of completion of each game to and from the server 3 through the relevant router 2, for example.

Figure 4:
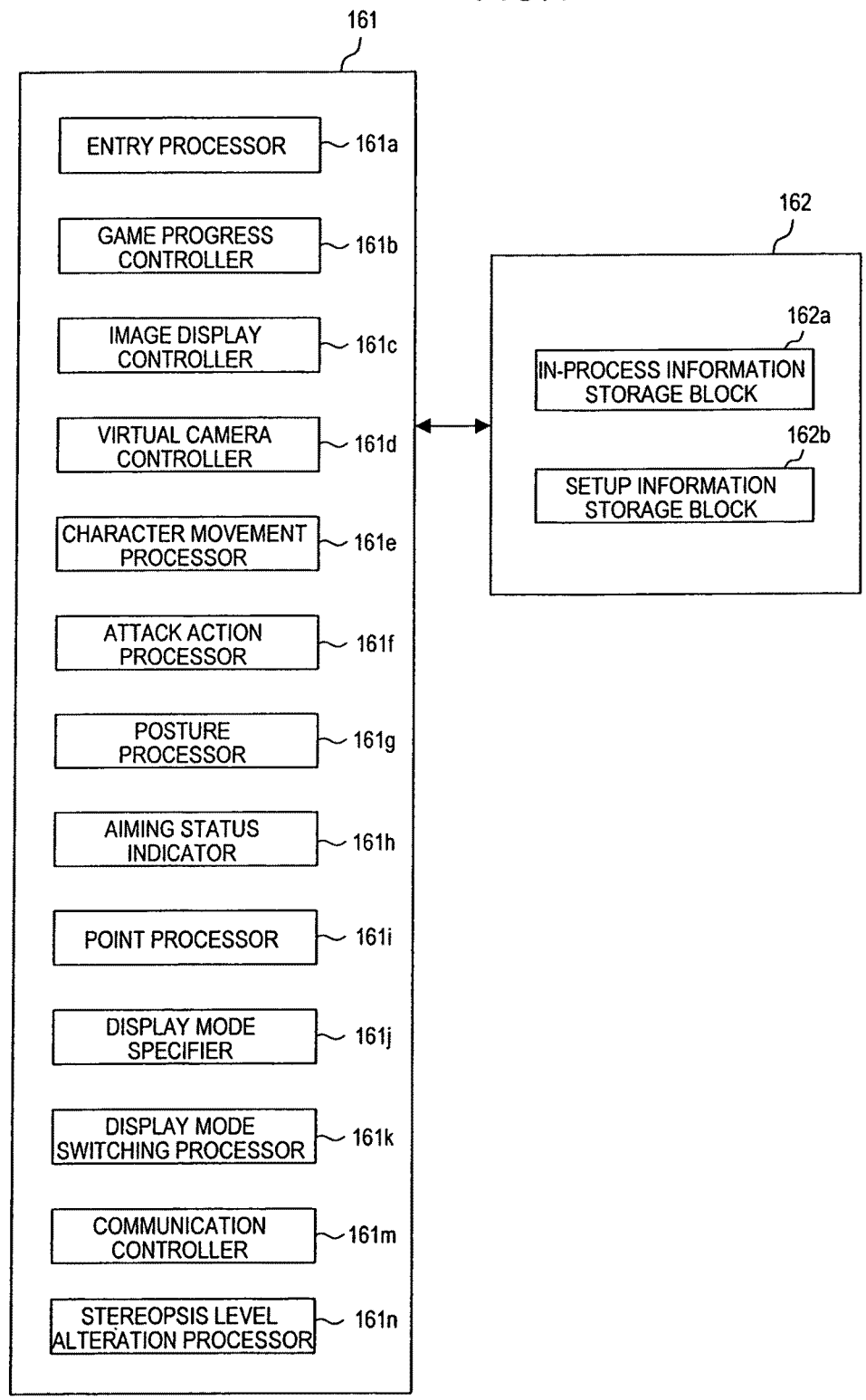
FIG. 4 is a functional configuration diagram of a control section of the gaming terminal.

FIG. 4 is a functional configuration diagram of the control section 16 of the gaming terminal 1. By executing the game program and the control program held in the RAM 162, the CPU 161 serves as a plurality of functional blocks including an entry processor 161*a* which performs an operation for accepting the entry of each player into a shooting game, a game progress controller 161*b* which causes the shooting game to proceed while controlling the progress thereof all the way from a starting point to an ending point of the shooting game, and an image display controller 161*c* which controllably provides an on-screen presentation of such images as an entry screen image and a gaming image on the monitor 11. The functional blocks of the CPU 161 activated by executing the game program and the control program held in the RAM 162 further includes a virtual camera controller 161*d* which controls the position and viewing direction of each virtual camera 60, a character movement processor 161*e* which processes movement of the player's own character in the virtual game space, an attack action processor 161*f* which processes each attack action performed by the player's own character using a weapon held thereby in the form of a virtual image, a posture processor 161*g* which controls a posturing action performed in advance of an attack action in preparation therefor, an aiming status indicator 161*h* which serves to present the status of aiming including a shooting direction during execution of the posturing action, a point processor 161*i* which gives the player a prescribed number of points in the event of a successive attack on a foe character (e.g., a successive firearm shooting at a foe character), a display mode specifier 161*j* which issues a command to switch between 2D display mode and 3D display mode as will be described later, a display mode switching processor 161*k* which controllably varies a positional relationship between the later-described two virtual cameras 60 when switching between the 2D and 3D display modes, and a communication controller 161*m* which controls exchanges of various kinds of information.

The entry processor 161*a* accepts the entry of a new player when the player inserts his or her user card into the card reader 13 of the gaming terminal 1. The entry processor 161*a* then reads the user ID from the user card and transmits the read user ID to the server 3. In a case where a plurality of fighting modes are available, a desired fighting mode can be selected by depressing the joystick 41 or a switch or a button whichever specified, for example.

The virtual camera controller 161*d* serves to adjust the viewpoint and viewing direction of each virtual camera 60 when the optical mouse 31 is manipulated according to details of manipulation. The virtual camera controller 161*d* sets the position of each virtual camera 60 in terms of a relative positional relationship with the player's own character. In this invention, the gaming terminal 1 is provided with the two virtual cameras 60, which may hereinafter be referred to as the virtual cameras 60L and 60R where necessary, to enable 3D image presentation as will be described later in detail. A detailed description of how these virtual cameras 60L, 60R move when the optical mouse 31 is manipulated will also be provided later with reference to FIG. 7.

The character movement processor 161*e* serves to adjust the moving speed and direction of the player's own character when the joystick 41 is manipulated according to details of manipulation. The virtual camera controller 161*d* controls the virtual cameras 60 in such a manner that, when the player's own character moves, the viewpoint of each virtual camera 60 moves in parallel with the moving player's own character. This makes it possible to maintain the relative positional relationship between the viewpoint of the player's own character and surrounding objects and present the gaming image showing the correctly located surrounding objects. The gaming image presented on the monitor 11 by the image display controller 161*c* reflects the result of processing by the character movement processor 161*e*.

Figure 7:
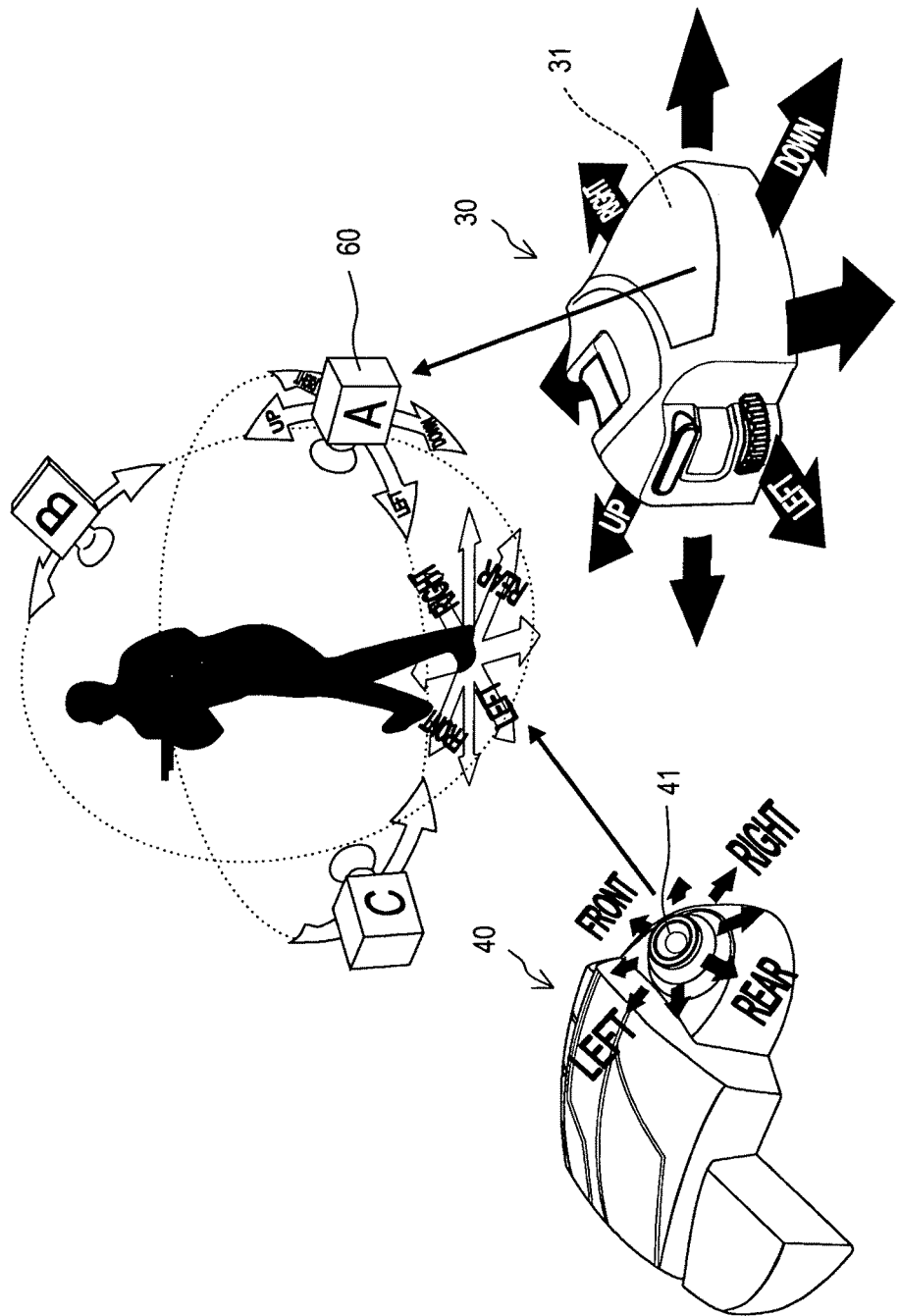
FIG. 7 is a diagram for explaining how each virtual camera moves in relation to movements of a player's own character.

FIG. 7 is a diagram for explaining how each virtual camera 60 moves in relation to movement of the player's own character. Referring to FIG. 7, when the first control pad 30 (optical mouse 31) is slid along a front-rear (up-down) direction, the optical mouse 31 measures the amount of mouse sliding (sliding distance) and causes the virtual camera pair 60 to pan by an angle corresponding to the measured sliding distance. If the virtual camera pair 60 is currently at a position marked by "A" (FIG. 7) and the optical mouse 31 is slid frontward, for example, the virtual camera pair 60 is caused to pan in a direction toward a position marked by "B" (FIG. 7) by an angle corresponding to the sliding distance. On the contrary, if the optical mouse 31 is slid rearward, the virtual camera pair 60 currently at the "A" position is caused to pan in a direction toward a position marked by "C" (FIG. 7) by an angle corresponding to the sliding distance. Also, if the virtual camera pair 60 is currently at the "A" position and the optical mouse 31 is slid leftward or rightward, then the virtual camera pair 60 is caused to pan in a leftward or rightward direction in a horizontal plane by an angle corresponding to the sliding distance. The virtual camera controller 161*d* pans each virtual camera 60 according to the direction and distance of sliding of the optical mouse 31 by the player and, as a consequence, the image display controller 161*c* presents an image showing every object located within a prescribed view angle of each virtual camera 60 in the viewing direction thereof. Accordingly, the gaming terminal 1 operated by each player presents a gaming image containing objects centered around the relevant player on the monitor 11 even in the case of a group shooting game played in a common virtual game space.

Additionally, when the control stick of the joystick 41 is tilted in one direction (front, rear, left, right or else) by a specific angle, the joystick 41 outputs an electrical signal corresponding to the direction and angle of tilt of the control stick to the character movement processor 161*e*. Based on this electrical signal, the character movement processor 161*e* causes the player's own character to move at a velocity corresponding to the joystick tilt direction and angle. The moving direction of the player's own character is determined with reference to a current facing direction of the player's own character. FIG. 7 shows an example in which the player's own character is going to move forward. Moving the player's own character in a desired direction by manipulating the joystick 41, the player can cause his or her own character to approach a foe character or retreat and thereby proceed with the game advantageously. Moreover, by operating the optical mouse 31 while manipulating the joystick 41 to move his or her own character, the player can move his or her own character more properly while checking objects surrounding his or her own character.

Upon sensing a depression of the trigger button 32, the attack action processor 161*f* causes the player's own character to attack a foe character with a virtual weapon available at hand. The posture processor 161*g* directs the player's own character in the prescribed viewing direction of each virtual camera 60 when the posture button 42 is depressed. Specifically, the posture processor 161*g* serves to make the direction of the virtual weapon (e.g., a barrel thereof) possessed by the player's own character coincide with or become parallel to the viewing direction of each virtual camera 60. Meanwhile, there is a choice of third person shooter (TPS) display mode and first person shooter (FPS) display mode in determining the viewpoint of each virtual camera 60. The viewpoint of each virtual camera 60 is set at a position obliquely behind a specified part of the player's own character (e.g., an upper part of the character body) in the TPS display mode, whereas the viewpoint is set at a face position of the player's own character or at the position of the virtual weapon in the FPS display mode. When the posture button 42 is depressed, the position of each virtual camera 60 is controlled in the TPS display mode. In this case, the virtual camera controller 161*d* sets the viewpoint (and thus the viewing direction) of each virtual camera 60 to generally coincide with the player's own character (i.e., at an "over-the-shoulder" position) and, therefore, the center of the display screen of the monitor 11 corresponds to the "over-the-shoulder" position of the player's own character (refer to FIG. 15, for example).

FIG. 8 is a diagram for explaining a state in which the player's own character has assumed an attacking posture. As illustrated in FIG. 8, the virtual camera pair 60 is aimed generally frontward. If the posture button 42 is depressed in this condition, the barrel of the virtual weapon is aimed in a frontward direction which matches the viewing direction of each virtual camera 60 regardless of the facing direction of the player's own character. FIG. 8 contains at left pictures (A) and (B) in which the player's own character assumes an attacking posture, holding the virtual weapon (handgun object) aimed forward. Both of these pictures (A), (B) show images illustrated in the FPS display mode, each image containing an aiming mark 11*a* shown at the center of the display screen representing a point at which the barrel of the virtual weapon is aimed. The aiming status indicator 161*h* serves to present the on-screen aiming mark 11*a* in association with the posture processor 161*g*. In picture (A), the aiming mark 11*a* is off a foe character 110 and, therefore, the player's own character will miss the foe character 110 even if the player depresses the trigger button 32 in this state. Thus, the player may slide the optical mouse 31 leftward by a specific amount so that the aiming mark 11*a* shifts leftward and overlies the foe character 110 as shown in picture (B). To be more specific, the player is to slide the optical mouse 31 leftward from the state shown in picture (A) so that the foe character 110 is shifted rightward (relative to the aiming mark 11*a*) until the foe character 110 comes to the center of the display screen of the monitor 11 where the aiming mark 11*a* overlies the foe character 110. The player's own character can hit the foe character 110 if the player depresses the trigger button 32 in this state.

The attack action processor 161*f* may calculate the trajectory of a bullet ejected from the barrel of the virtual weapon and present the trajectory on-screen according to the result of calculation, or the present embodiment may employ an arrangement in which the bullet will pass through a circle having a specific diameter (or a specified area) centered around a central point of the cross-shaped aiming mark 11*a* in an imaginative fashion. With this arrangement employed, it is judged that the foe character 110 has been successfully hit if part of the foe character 110 overlies the aforementioned specified area. It is to be noted, however, that the bullet does not necessarily proceed toward the central point of the cross-shaped aiming mark 11*a*. Thus, the attack action processor 161*f* may perform a processing operation for simulating an irregular vibratory motion of a barrel of a machine gun or the like or a processing operation for simulating a situation in which the virtual weapon irregularly goes off an intended shooting direction while the player's own character is in motion, for example.

The point processor 161*i* is configured to accumulate a prescribed number of points for the player in the event of a successive attack on the foe character 110, or at each successive target shot, for example. The point processor 161*i* may be configured to calculate the sums of the accumulated points separately for friend and foe sides at a game ending point to allow a decision on victory or defeat depending on which side has gained a larger number of points. The point processor 161*i* may additionally be configured such that the player's own character assumes a "hit-down" pose for a specific period of time when hit by another player, and the player is prohibited from entering any command that causes the player's own character to move or attack. Alternatively, the point processor 161*i* may be configured such that the player's own character is assigned a specific "life value" at a game starting point and loses the life value in decremental steps each time the player's own character is hit by another player. Once the player's life value has become zero, the player's own character will be prohibited from returning to the game, which means only that player will receive a forced "game over" declaration.

The display mode specifier 161*j* issues a command for automatically switching between the 2D display mode and the 3D display mode in accordance with the player's manipulation of the setter 15 or by sensing whether the game currently in progress has reached a prescribed situation or returned to an initial situation. The 2D display mode is a method of directly presenting a 3D image with no three-dimensional (stereoscopic, or 3D) effect. In contrast, the 3D display mode is a method of presenting a 3D image with the 3D effect by leading images having parallax for left and right eyes to the respective eyes to re-create the 3D image with stereopsis achieved when viewed by the left and right eyes.

Figure 9A:
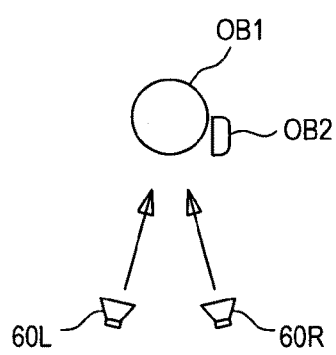
FIGS. 9A and 9B are schematic diagrams for explaining a principle of 3D display mode applied to a gaming image, FIG. 9A illustrating a relationship between a pair of virtual cameras and a subject and FIG. 9B illustrating a relationship between images captured by the pair of virtual cameras and an image displayed on a monitor.
Figure 9B:
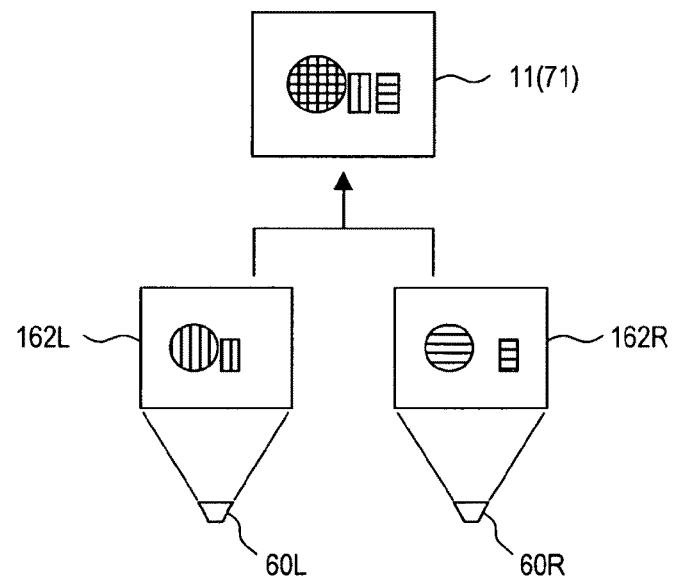
Figure 10:
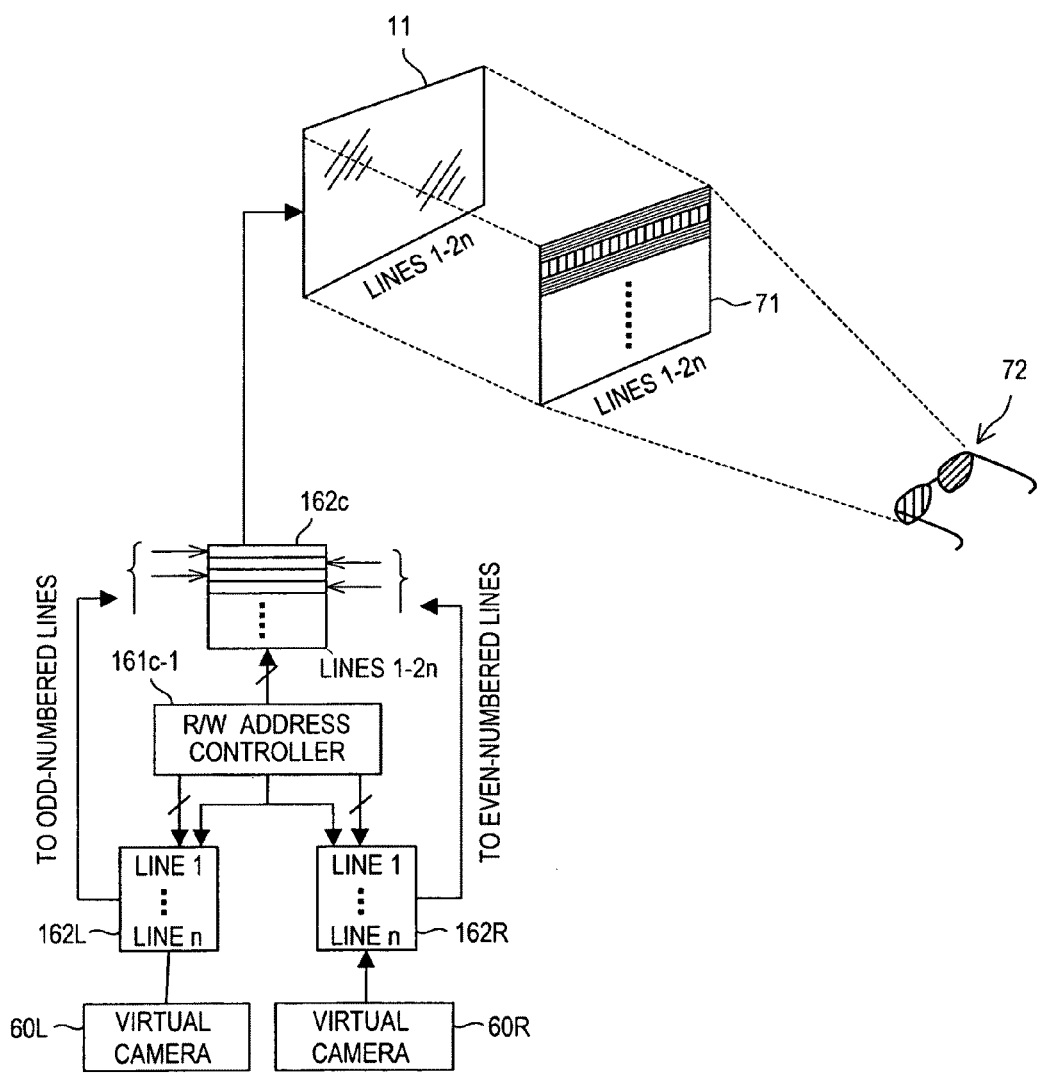
FIG. 10 is a configuration diagram illustrating an arrangement for displaying the gaming image in the 3D display mode.

FIGS. 9A and 9B are schematic diagrams for explaining a principle of the 3D display mode applied to a gaming image, FIG. 9A illustrating a relationship between the pair of virtual cameras 60L, 60R and a subject and FIG. 9B illustrating a relationship between images captured by the pair of virtual cameras 60L, 60R and an image displayed on the monitor 11. FIG. 10 is a configuration diagram illustrating an arrangement for displaying the gaming image in the 3D display mode.

As illustrated in these Figures, there are provided the virtual cameras 60L and 60R which correspond to the left and right human eyes, respectively, in the virtual game space. The two virtual cameras 60L, 60R have a prescribed positional relationship with viewing directions thereof intersecting at a specific position in a depthwise direction. Typically, the viewing directions of the two virtual cameras 60L, 60R intersect at the position of a character or an object, each being a subject located in the virtual game space. An image storage block 162L is a memory area defined in one part of the RAM 162 where image data for one scene captured by the image storage block 162L in the virtual game space is written. An image storage block 162R is a memory area defined in another part of the RAM 162 where image data for one scene captured by the image storage block 162R in the virtual game space is written. Objects OB1 and OB2 shown in FIG. 9A represent subject images contained in the captured scene. The viewing directions of the two virtual cameras 60L, 60R are set to aim at the object OB1 in the illustrated example (FIG. 9A). For the sake of explanation, each image captured by the virtual camera 60L is depicted by parallel vertical lines while each image captured by the virtual camera 60R is depicted by parallel horizontal lines in FIG. 9B.

The images stored in the image storage blocks 162L, 162R are synthesized and then the monitor 11 displays a synthesized image. As will be discussed later, the monitor 11 is provided with a sheetlike parallax barrier member 71 attached to a screen surface. The parallax barrier member 71 may be an optical device supplied from Arisawa Manufacturing Ltd.

under the brand name Xpol (registered trademark), for example. Referring to FIG. 10, the parallax barrier member 71 is a device configured with a number of fine polarizing strips which are arranged in a regular pattern including vertically polarizing zones in which vertically oriented slits are formed as well as horizontally polarizing zones in which horizontally oriented slits are formed, the vertically polarizing zones and the horizontally polarizing zones being alternately arranged at specific intervals (each corresponding to the width of a single horizontal scanning line) in a vertical direction. With the parallax barrier member 71 thus configured, the vertically polarizing zones permit only vertically polarized light contained in an optical image emitted from the monitor 11 to pass through, whereas the horizontally polarizing zones permit only horizontally polarized light contained in the optical image from the monitor 11 to pass through (refer to FIG. 9B). A pair of glasses 72 includes left and right eyeglasses to which fine polarizing films (polarizers) for the vertically polarized light and the horizontally polarized light are attached, respectively, wherein the left eyeglass permits only the vertically polarized light to pass through and the right eyeglass permits only the horizontally polarized light to pass through. Thus, as the player wearing the pair of glasses 72 watches polarized optical images on the monitor 11 that produce parallax to his or her left and right eyes, the player is given stereoscopic vision and can see a 3D image which gives a stereoscopic feeling.

More specifically, referring to FIG. 10, the virtual cameras 60L, 60R perform repetitive image pickup operations at specific time intervals, or at 1/60 second intervals, for example, and images captured at each successive timing are temporarily written in the respective image storage blocks 162L, 162R. The image storage blocks 162L, 162R each have a storage capacity for n lines (horizontal rows of pixels) arranged in a vertical direction by m columns arranged in a horizontal direction, while a video RAM 162c has a storage capacity for 2n lines arranged in the vertical direction by m columns arranged in the horizontal direction.

The image display controller 161c includes a read/write address controller 161c-1 which reads out image data from each successive line of the image storage block 162L and writes the same in an odd-numbered line of the video RAM 162c. After writing image data in one odd-numbered line of the video RAM 162c, the read/write address controller 161c-1 reads out image data from one line of the image storage block 162R and writes the same in an even-numbered line of the video RAM 162c. The read/write address controller 161c-1 repeats this read/write sequence for one line of the video RAM 162c after another. To carry out this read/write sequence, the read/write address controller 161c-1 successively creates read addresses and write addresses and generates a chip select signal. Upon completion of the aforementioned read/write sequence, the video RAM 162c holds the image data necessary for generating left- and right-eye images.

The image data thus stored in the video RAM 162c is successively read out and sent to the monitor 11 at a specific high speed. The monitor 11 has the same number of pixels as the video RAM 162c, that is, 2n by m pixels. As shown pictorially in FIG. 10, the parallax barrier member 71 has the fine polarizing strips forming the vertically polarizing zones for passing only the vertically polarized light and the fine polarizing strips forming the horizontally polarizing zones for passing only the horizontally polarized light and, as already mentioned, the vertically polarizing zones (depicted by parallel vertical lines) and the horizontally polarizing zones (depicted by parallel horizontal lines) are alternately arranged in the vertical direction at specific intervals that correspond to the width of each successive horizontal line, or each row of pixels.

Meanwhile, the aforementioned arrangement of the embodiment described with reference to FIGS. 9A, 9B and 10 may be modified such that the image storage blocks 162L, 162R for storing the images captured by the virtual cameras 60L, 60R each have a storage capacity for 2n lines arranged in the vertical direction. According to the arrangement thus modified, the image storage blocks 162L, 162R each have the same number of lines (horizontal rows of pixels) arranged in the vertical direction as the monitor 11 and, therefore, it is possible to produce in the 3D display mode a 3D image having as high a resolution as achieved in the 2D display mode. Also, the aforementioned arrangement of the embodiment may be so modified as to read out the data content of the image storage blocks 162L, 162R and output the same directly to the monitor 11 instead of once writing the image data in the video RAM 162c. This modification involving synchronized read and output operations will make it possible to devise an arrangement which does not require the video RAM 162c to be provided.

The foregoing discussion has dealt with a case where the virtual cameras 60L, 60R are located at two different positions with a prescribed positional relationship therebetween for the 3D display mode. Described now in the following is a case where the 2D display mode is selected.

If the display mode specifier 161j outputs a command signal for display mode switching from the 3D display mode to the 2D display mode, the virtual camera controller 161d controls the virtual cameras 60L, 60R so that the positions and viewing directions thereof coincide with each other. Consequently, the two virtual cameras 60L, 60R capture the same image and, thus, the image storage blocks 162L, 162R stores the same image data. Further, the image data is written in the individual lines of the video RAM 162c by essentially the same procedure (read/write sequence) as used in the 3D display mode. Since images presented on the monitor 11 for the left and right eyes no longer produce parallax in this case, the combined image will not give the player wearing the pair of glasses 72 any stereoscopic feeling, which is a "normal" state of on-screen presentation where a 3D image is presented in the 2D display mode. If the display mode specifier 161j outputs a command signal for display mode switching from the 2D display mode to the 3D display mode, on the contrary, the virtual camera controller 161d sets the virtual cameras 60L, 60R at separate positions having the prescribed positional relationship therebetween and, as a result, parallax is created for the left and right eyes, making it possible to give a stereoscopic feeling. The above-described approach makes it possible to switch the on-screen presentation between the 2D display mode and the 3D display mode by simply performing an operation for altering the positions of the two virtual cameras 60L, 60R. The control program that permits execution of such display mode switching operation is stored in advance in the ROM 163.

The virtual camera controller 161d sets the positions of the virtual cameras 60L, 60R that determine the positional relationship therebetween in a manner described below. Specifically, the left and right virtual cameras 60L, 60R are set at positions offset left and right by a specific distance from a reference point (central point) defined according to position information which is controlled based on the assumption that there is provided only one virtual camera. Images captured by the virtual cameras 60L, 60R will be more natural if the distance between the virtual cameras 60L, 60R is made generally equal to the distance between two human eyes, and it is preferable to so position the virtual cameras 60L, 60R. In one varied form of the embodiment, the positions of the virtual cameras 60L, 60R may be determined using the position of one virtual camera 60 as a reference point.

Returning to FIG. 4, the RAM 162 of the control section 16 is configured to include an in-process information storage block 162a for storing constantly updated in-process game information which contains operational information produced by all of the players playing a shooting game in the same virtual game space, the players including the primary player and the friend and foe players whose operational information is obtained through the network communication section 18, as well as a setup information storage block 162b for storing setup information and point information concerning settings and operations made by the players by manipulating various switches and buttons. Each time the shooting game is finished, the communication controller 161m transmits the point information to the server 3 together with the player's user ID and the identification information related to the gaming terminal 1 and an arcade game parlor.

Figure 5:
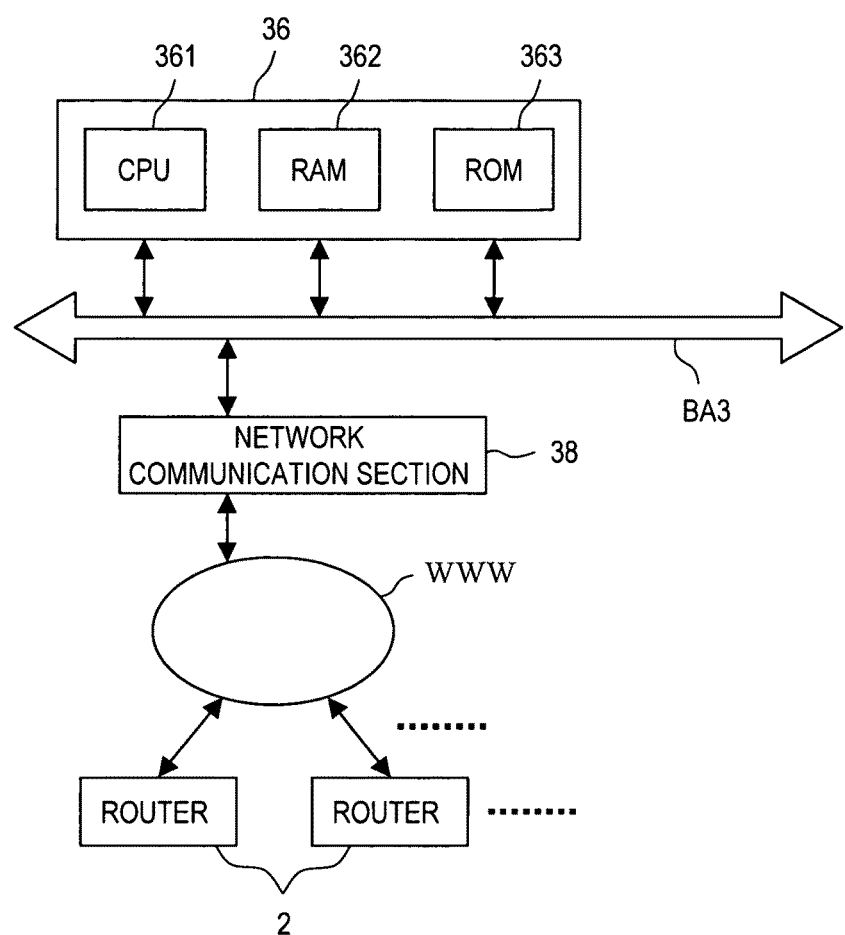
FIG. 5 is a hardware configuration diagram of a server according to the embodiment.

FIG. 5 is a hardware configuration diagram of the server 3 according to the present embodiment. The server 3 is provided with a control section 36 for controlling overall operation of the server 3, the control section 36 including a CPU 361 serving as an information processor, a RAM 362 for temporarily storing the player's personal information and game-related information regarding each player, for instance, and a ROM 363 in which prescribed image information for management purpose and a management program are stored in advance.

Among various kinds of data stored in the ROM 363, data stored in a removable storage medium may be made readable by such a drive as a hard disk drive, an optical disc drive, a flexible disk drive, a silicon disk drive or a cassette medium reading device, for example. In this case, a suitable storage medium is a hard disk, an optical disc, a flexible disk, a CD, a DVD or a semiconductor memory, for example.

A network communication section 38 also provided in the server 3 performs transmission and reception of various kinds of data to and from any specified one of the gaming terminals 1 according to terminal identification information through a network like the Worldwide Web (abbreviated WWW) and one of the routers 2.

The management program stored in the ROM 363 is loaded into the RAM 362 and the CPU 361 executes a game progress program held in the RAM 362 to perform functions successively activated by running the game progress program.

Figure 6:
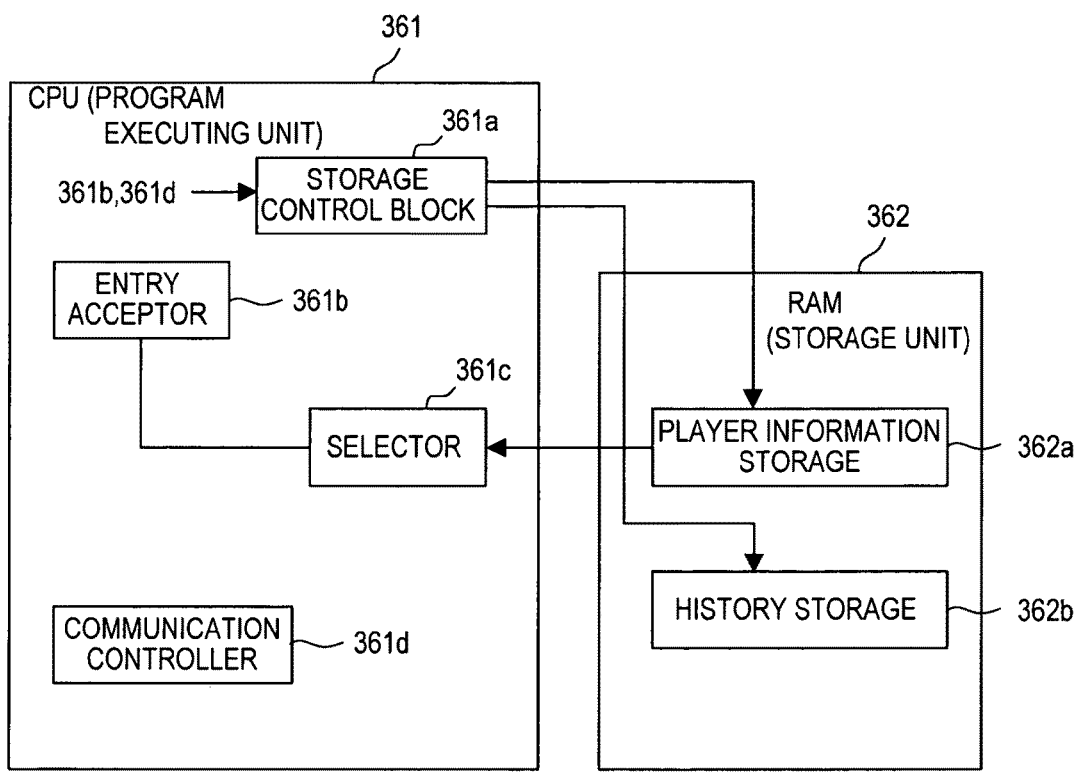
FIG. 6 is a functional configuration diagram of a control section of the server.

FIG. 6 is a functional configuration diagram of the control section 36 of the server 3. The RAM 362 of the control section 36 is configured to include a player information storage block 362a for storing such personal information as the user ID and a history storage block 362b for storing a constantly updated history of game scoring information (game results) of the individual players.

The CPU 361 of the control section 36 serves as a plurality of functional blocks including a storage control block 361a which controllably records individual kinds of information in the player information storage block 362a and the history storage block 362b, an entry acceptor 361b which performs a sequence of entry acceptance management operation for accepting participation of a player in a game as a result of acceptance of the player's entry into the game at each of the gaming terminals 1, a selector 361c which determines a combination of specified numbers of players (e.g., 4 players each on the friend and foe sides) who are selected to play the game in the same virtual game space from among the players accepted by the entry acceptor 361b according to a later-described rule, and a communication controller 361d which controls exchanges of information to and from the individual gaming terminals 1.

The entry acceptor 361b receives such personal information as the player's user ID and the identification information related to the gaming terminal 1 and an arcade game parlor transmitted from one of the gaming terminals 1 and then admits the player to the game.

In addition, the entry acceptor 361b issues a command for defining a combination of competing players to the selector 361c if any player(s) is (are) scheduled to participate in a competitive game. The selector 361c selects players who will play a game in the same game space according to predefined conditions (or the rule). Generally, the selector 361c selects participating players in the order of entry acceptance, for example. It is also preferable for the selector 361c to give priority to players accepted in the same arcade game parlor and allocate these players in the same game space. As an example, the selector 361c regards players participating almost simultaneously from the same arcade game parlor as friends and, thus, allocates these players in the same game space as friend players. If the number of friend players does not reach a prescribed number (4 in this embodiment), the selector 361c may select one or more players who wish to participate in the game from other game parlor(s). The selector 361c may also select a group of foe players in a manner similar to what has been described above.

An alternative arrangement which may be used when a plurality of players are willing to participate in a shooting game would be to allow one of the players to indicate that those players wish to play in a group of friend players at one of the gaming terminals 1 (or a "master terminal") in an arcade game parlor that has first accepted the player's entry. This arrangement will enable the simultaneously participating players to play as members of a friend player group in a reliable fashion.

After the selector 361c has established a linkage between each participating player and the virtual game space, the entry acceptor 361b transmits information concerning this linkage to the gaming terminal 1 at which the entry of the pertinent player has been accepted. Also, the server 3 is configured such that the communication controller 361d thereof transmits player information concerning each player to the gaming terminals 1 operated by the other participating players when all the players have been linked to the virtual game space, the player information including at least the identification information concerning the gaming terminal 1 operated by each player and the arcade game parlor where that gaming terminal 1 is installed. This arrangement allows the individual player's gaming terminals 1 to exchange the operational information.

Referring now to FIGS. 11 to 17, some examples of gaming images displayed on-screen during a shooting game are explained. The display mode specifier 161j shown in FIG. 4 generates a command signal for display mode switching from the 2D display mode to the 3D display mode when the shooting game in progress reaches one of situations described below. Although it is possible to generate a command for alternately switching the display mode by successively depressing the pushbutton setter 15, for example, there may be made an arrangement for display mode switching from the 2D display mode to the 3D display mode upon fulfillment of otherwise defined conditions. The gaming terminal 1 may be so configured as to automatically return to the 2D display mode at a point in time when a prescribed game situation ceases to exist or, alternatively, as to remain in the 3D display mode until the pushbutton setter 15 is depressed.

Figure 11:
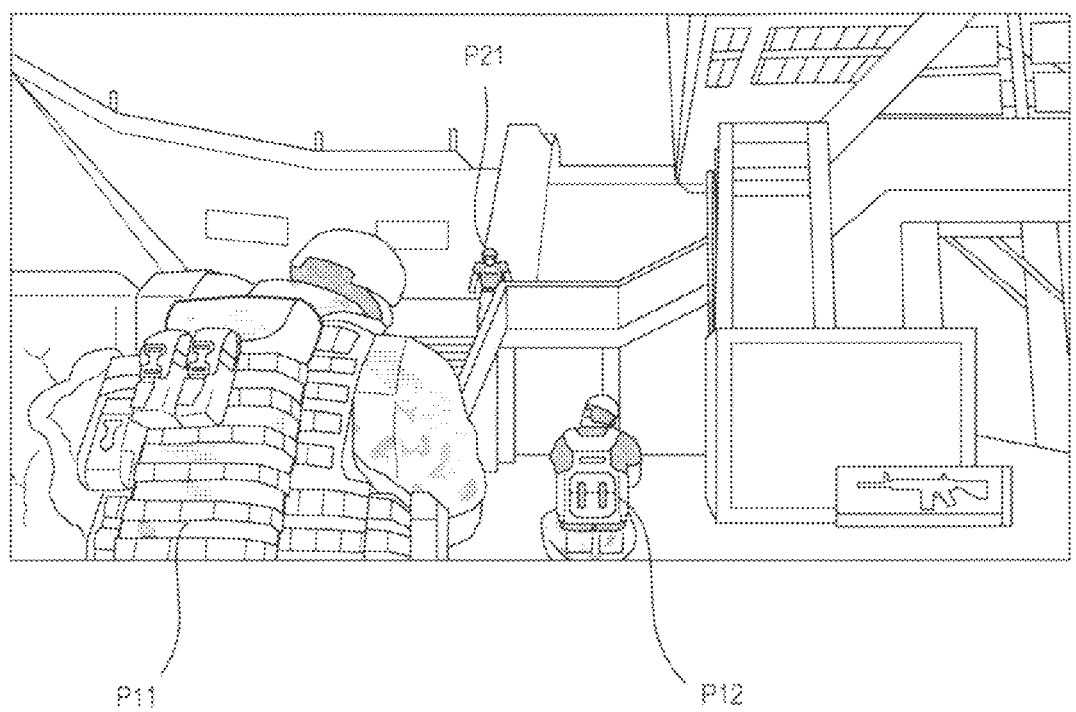
FIG. 11 is a diagram depicting an exemplary gaming image displayed on-screen during a shooting game.

Depicted in FIG. 11 is an image of a fighting scene presented on the display screen of the monitor 11 that represents, in particular, a situation where a foe character P21 has appeared in front of a character P11 of the primary player and a character P12 of his or her friend player. As it is preferable that this kind of fighting scene be compellingly realistic, the display mode specifier 161j switches the gaming terminal 1 to the 3D display mode based on a judgment of the situation in which the foe character P21 has emerged.

Figure 12:
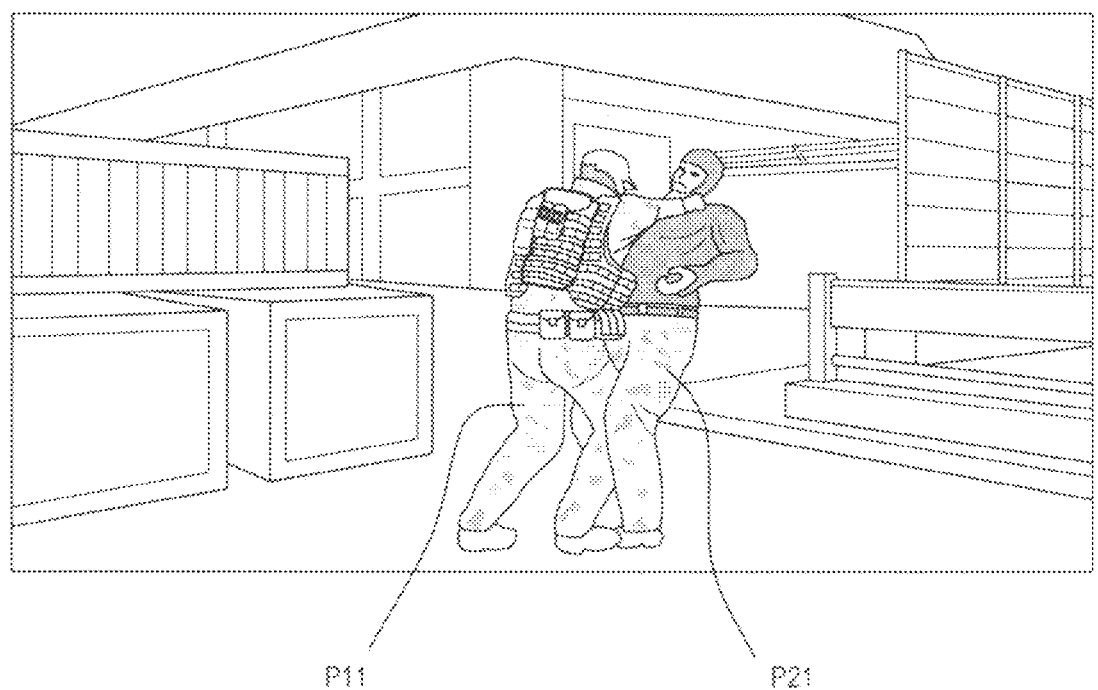
FIG. 12 is a diagram depicting another exemplary gaming image displayed on-screen during the shooting game.

Depicted in FIG. 12 is an image of a fighting scene in which the player's own character P11 is in direct combat against the foe character P21. As this kind of scene should preferably be compellingly realistic, the display mode specifier 161j switches the gaming terminal 1 to the 3D display mode in this situation as well. In this case, switching to the 3D display mode may occur when the commencement of the combat is detected.

Figure 13:
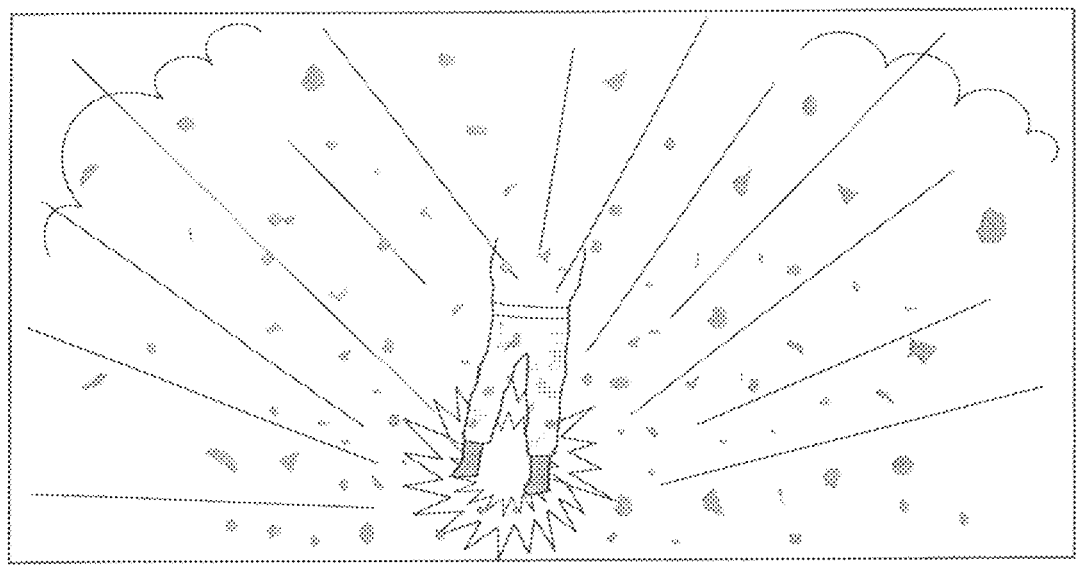
FIG. 13 is a diagram depicting another exemplary gaming image displayed on-screen during the shooting game.
Figure 14:
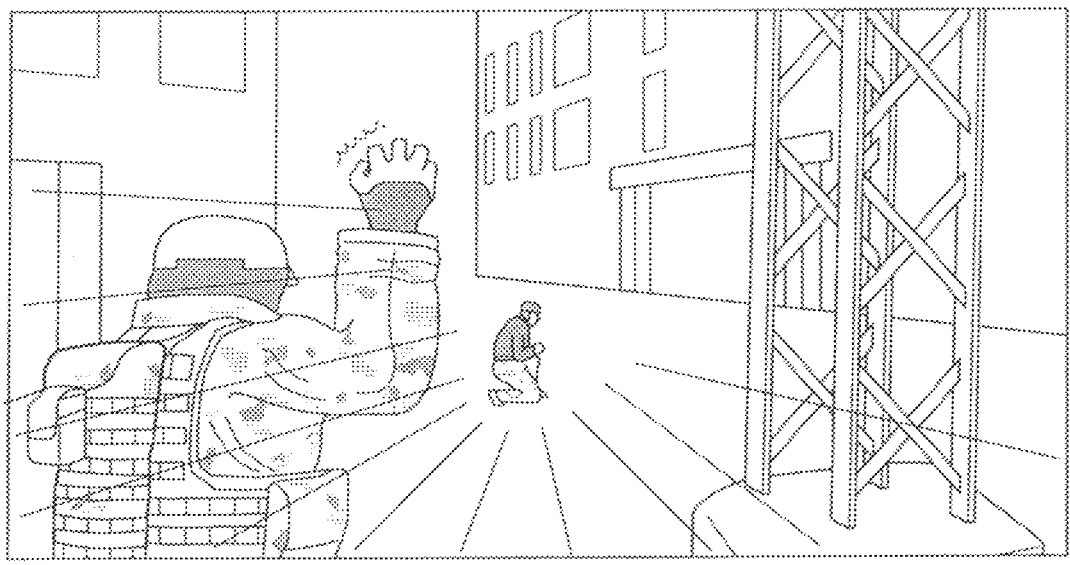
FIG. 14 is a diagram depicting another exemplary gaming image displayed on-screen during the shooting game.

FIGS. 13 and 14 depict scenes of fighting conducted by use of explosives, FIG. 13 being an image depicting a scene of a grenade attack and FIG. 14 being an image depicting a scene in which an object is blown by an explosion. Both of these fighting scenes will be presented in the 3D display mode to create true-to-life reality, in which case switching to the 3D display mode may be triggered upon sensing the occurrence of an explosion.

Figure 15:
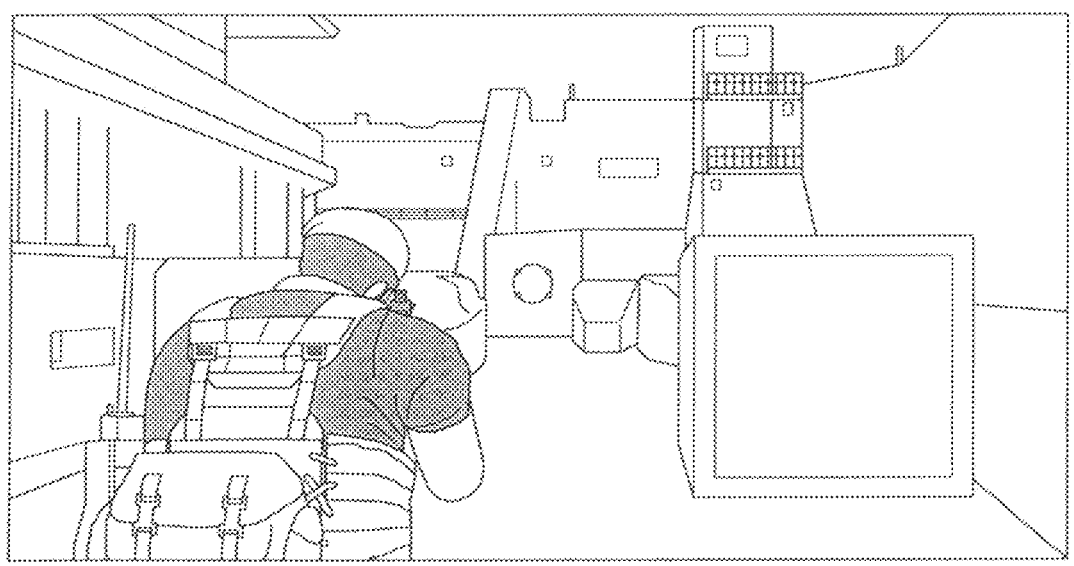
FIG. 15 is a diagram depicting another exemplary gaming image displayed on-screen during the shooting game.
Figure 16:
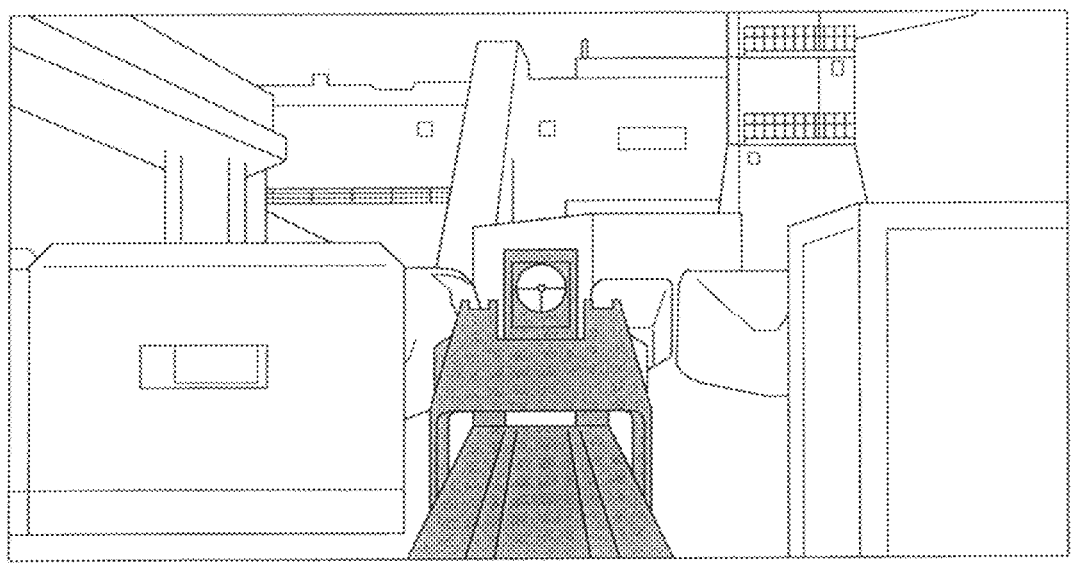
FIG. 16 is a diagram depicting still another exemplary gaming image displayed on-screen during the shooting game.

FIGS. 15 and 16 each depict a fighting scene in which a player's character is aiming a gun, FIG. 15 showing an "over-the-shoulder" TPS image and FIG. 16 showing an FPS image as viewed generally from a muzzle position. Each of these scenes represents a situation immediately before the player's character fires the gun aimed at a target and, thus, both images should be presented with an excitingly realistic sense of depth. To meet this requirement, the embodiment may employ an arrangement in which the display mode specifier 161j switches the gaming terminal 1 to the 3D display mode upon sensing a depression of the trigger button 32. From the viewpoint of reality in depth perception, however, only the image depicted in FIG. 16 may be made switchable to the 3D display mode.

Figure 17:
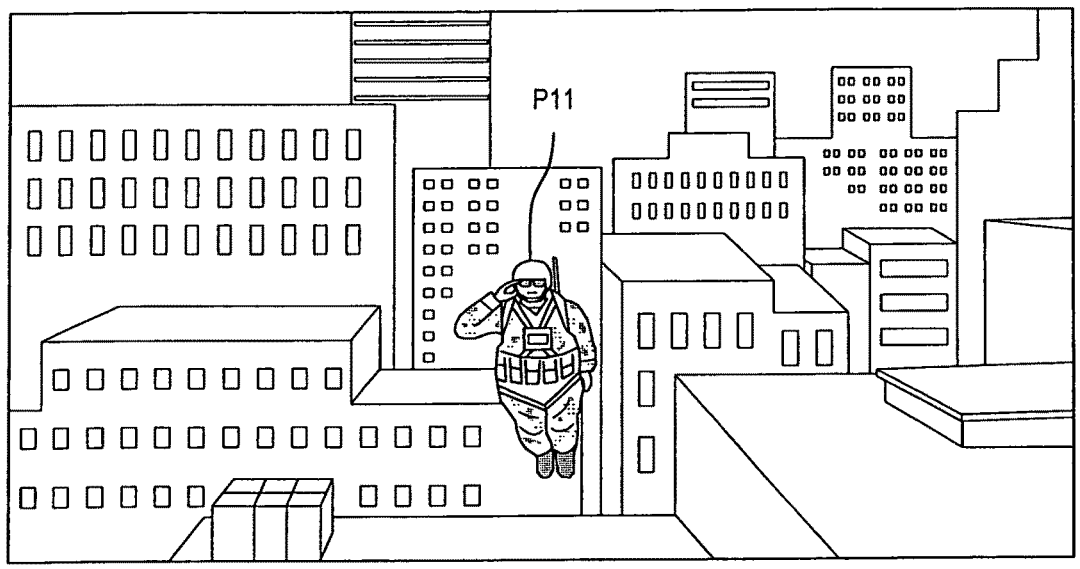
FIG. 17 is a diagram depicting yet another exemplary gaming image displayed on-screen during the shooting game.

Depicted in FIG. 17 is an image of a scene in which the player's own character P11 is in flight. Although not illustrated, a similar situation will occur when the character P11 is on a simulated vehicle like a helicopter that moves through the air, for example. In this kind of situation, the display mode specifier 161j switches the gaming terminal 1 to the 3D display mode to satisfy the need to create true-to-life reality with depth perception upon sensing that the player's own character P11 is currently in flight.

FIGS. 18A, 18B and 18C are diagrams for explaining stepwise changes between the 2D and 3D display modes, FIG. 18A depicting relative positional relationships between the two virtual cameras 60L, 60R, or distances therebetween, FIG. 18B depicting differences in the level of depth perception by a viewing player, and FIG. 18C depicting images that provide different levels of depth perception.

A pictorial representation at the left of FIG. 18A depicts a case where the two virtual cameras 60L, 60R are located together at the same position (positional relationship P4), that is, at zero distance from each other and with the viewing directions of the virtual cameras 60L, 60R matched with each other. In this case, the monitor 11 presents each image in the 2D display mode as depicted in pictorial representations at the left of FIGS. 18B and 18C. In the 3D display mode, on the other hand, the two virtual cameras 60L, 60R may be placed with positional relationship P1 at a prescribed distance from each other as illustrated (FIG. 18A). As can be seen from the illustrated example of FIG. 18A, there are two intermediate positional relationships P2, P3 between positional relationship P1 and positional relationship P4 in which the two virtual cameras 60L, 60R overlap each other. The distance between the two virtual cameras 60L, 60R in positional relationship P2 is made smaller than the distance in positional relationship P4, and the distance between the two virtual cameras 60L, 60R in positional relationship P3 is made yet smaller than the distance in positional relationship P2. As compared to positional relationship P1, positional relationships P2 and P3 provide the viewing player with depth perception of which level decreases stepwise in this order. In this embodiment, the viewing directions of the virtual cameras 60L, 60R are determined to intersect at a point of a specific subject (or at a point located at a prescribed distance forward). FIGS. 18B and 18C show images obtained with the positional relationships P1 and P3 only for reasons related to available spaces. It is to be pointed out that the positional relationships between the two virtual cameras 60L, 60R between the positional relationships P1 and P4 are not limited to the aforementioned two-step positional relationships P2 and P3 but any desired number of intermediate positional relationships may be defined in a stepwise fashion.

Figure 19:
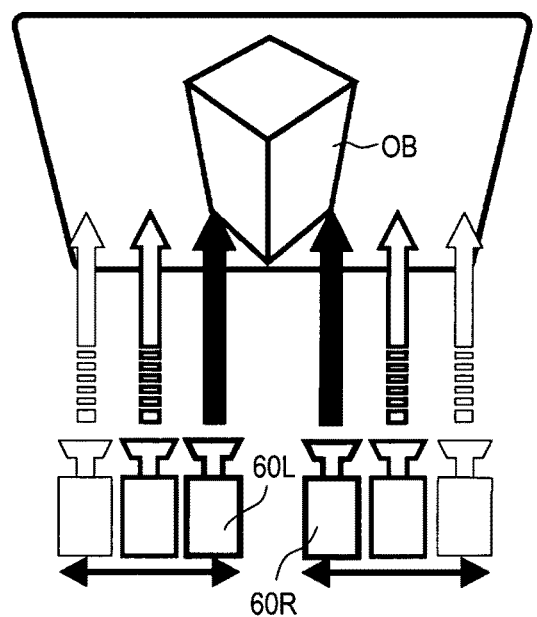
FIG. 19 is a diagram depicting an example of how the positional relationship between the two virtual cameras is varied.
Figure 20:
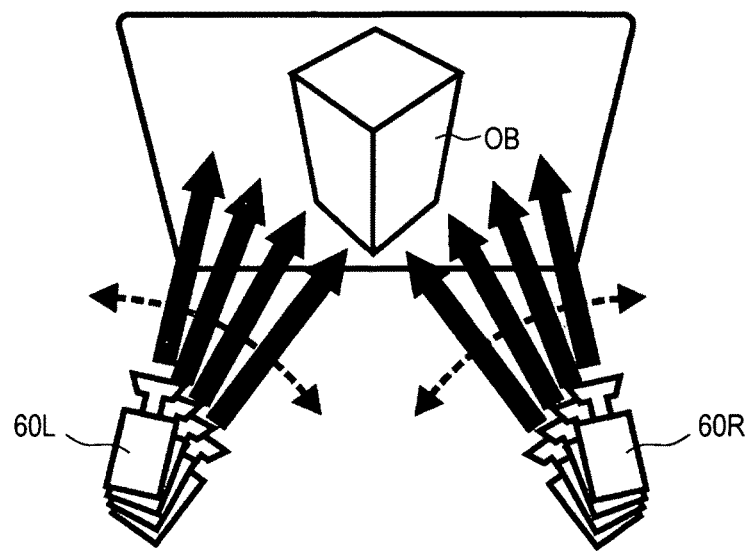
FIG. 20 is a diagram depicting another example of how the positional relationship between the two virtual cameras is varied.

FIGS. 19 and 20 are diagrams depicting other examples of positional relationships between the two virtual cameras 60L, 60R. Specifically, FIG. 19 illustrates a case where the virtual cameras 60L, 60R are arranged such that the viewing directions thereof are aligned parallel to each other and only the distance therebetween can be varied, whereas FIG. 20 illustrates a case where the distance between the two virtual cameras 60L, 60R is kept constant and the viewing directions thereof are made variable from short-distance viewing directions (which create a higher level of depth perception) to long-distance viewing directions (which create a lower level of depth perception). FIGS. 19 and 20 do not include any images produced in the 2D display mode.

Figure 21:
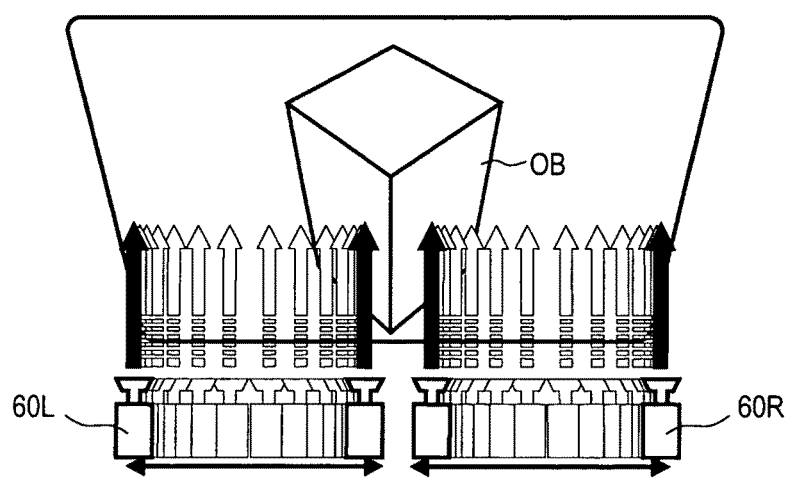
FIG. 21 is a diagram depicting an example of how a mode switching speed is varied stepwise during a process of switching between the 2D and 3D display modes.
Figure 22:
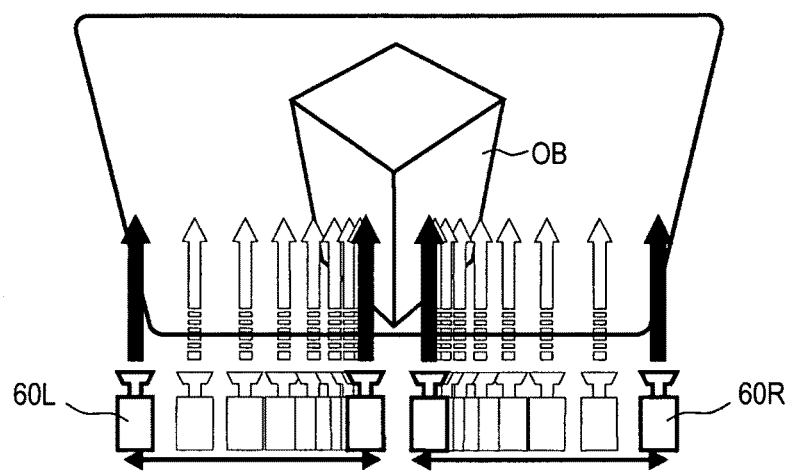
FIG. 22 is a diagram depicting another example of how the mode switching speed is varied stepwise during the process of switching between the 2D and 3D display modes.
Figure 23:
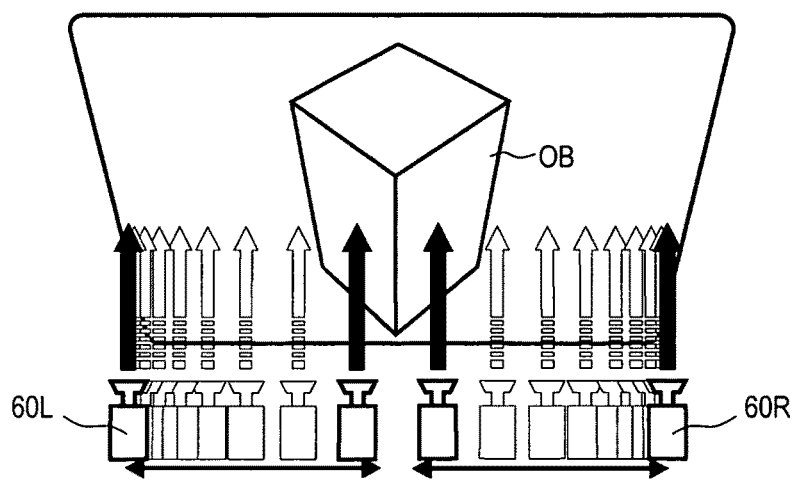
FIG. 23 is a diagram depicting yet another example of how the mode switching speed is varied stepwise during the process of switching between the 2D and 3D display modes.

FIGS. 21, 22 and 23 are diagrams depicting different examples of how a mode switching speed is varied stepwise during a process of switching between the 2D and 3D display modes. The display mode for gaming image presentation on the monitor 11 is switched at speeds varied in a plurality of steps but substantially uninterruptedly as depicted in FIGS. 21, 22 and 23. In the example of FIG. 21, the mode switching speed (which corresponds to the moving speed of each virtual camera 60) during the process of switching from the 3D display mode to the 2D display mode is made higher in initial and final stages of the mode switching process along a direction from the most separated positions to the closest positions of the two virtual cameras 60L, 60R and lower in a middle stage of the mode switching process. In the example of FIG. 22, the mode switching speed during the process of switching from the 3D display mode to the 2D display mode is made lower in the initial stage and higher in the final stage. More specifically, the mode switching speed is controlled to gradually increase during the mode switching process. In the example of FIG. 23, the mode switching speed during the process of switching from the 3D display mode to the 2D display mode is made higher in the initial stage and lower in the final stage, contrary to the example of FIG. 22. More specifically, the mode switching speed is controlled to gradually decrease during the mode switching process in this case. The mode switching speed is varied in the aforementioned manner by using a predefined scheme in which the mode switching speed is controlled based on the amount of change in the distance between the two virtual cameras 60L, 60R preset over regular time intervals, for example. Although the viewing directions of the two virtual cameras 60L, 60R are aligned parallel to each other in the examples depicted in FIGS. 21, 22 and 23, the viewing directions may intersect at a specific object OB or at a point located at a prescribed distance forward. Additionally, the mode switching speed during a process of switching from the 2D display mode to the 3D display mode is varied in a reversed manner with respect to the manner described above with reference to FIGS. 21, 22 and 23. It should, however, be understood that the invention is not limited thereto but may be such that the mode switching speed during the process of switching from the 2D display mode to the 3D display mode varies in the same way as in the process of switching from the 3D display mode to the 2D display mode.

To enable stepwise switching between the 2D and 3D display modes in the aforementioned manner, the ROM 163 of the gaming terminal 1 stores multi-step, camera-to-camera distance information concerning the virtual cameras 60L, 60R needed for stepwise switching from the 2D display mode to the 3D display mode. The ROM 163 also stores multi-step, camera-to-camera distance information concerning the virtual cameras 60L, 60R needed for stepwise switching from the 3D display mode to the 2D display mode. Upon receiving a command for display mode switching, the display mode switching processor 161k switches the display mode upon reading out the multi-step, camera-to-camera distance information concerning the virtual cameras 60L, 60R from the ROM 163.

Figure 24:
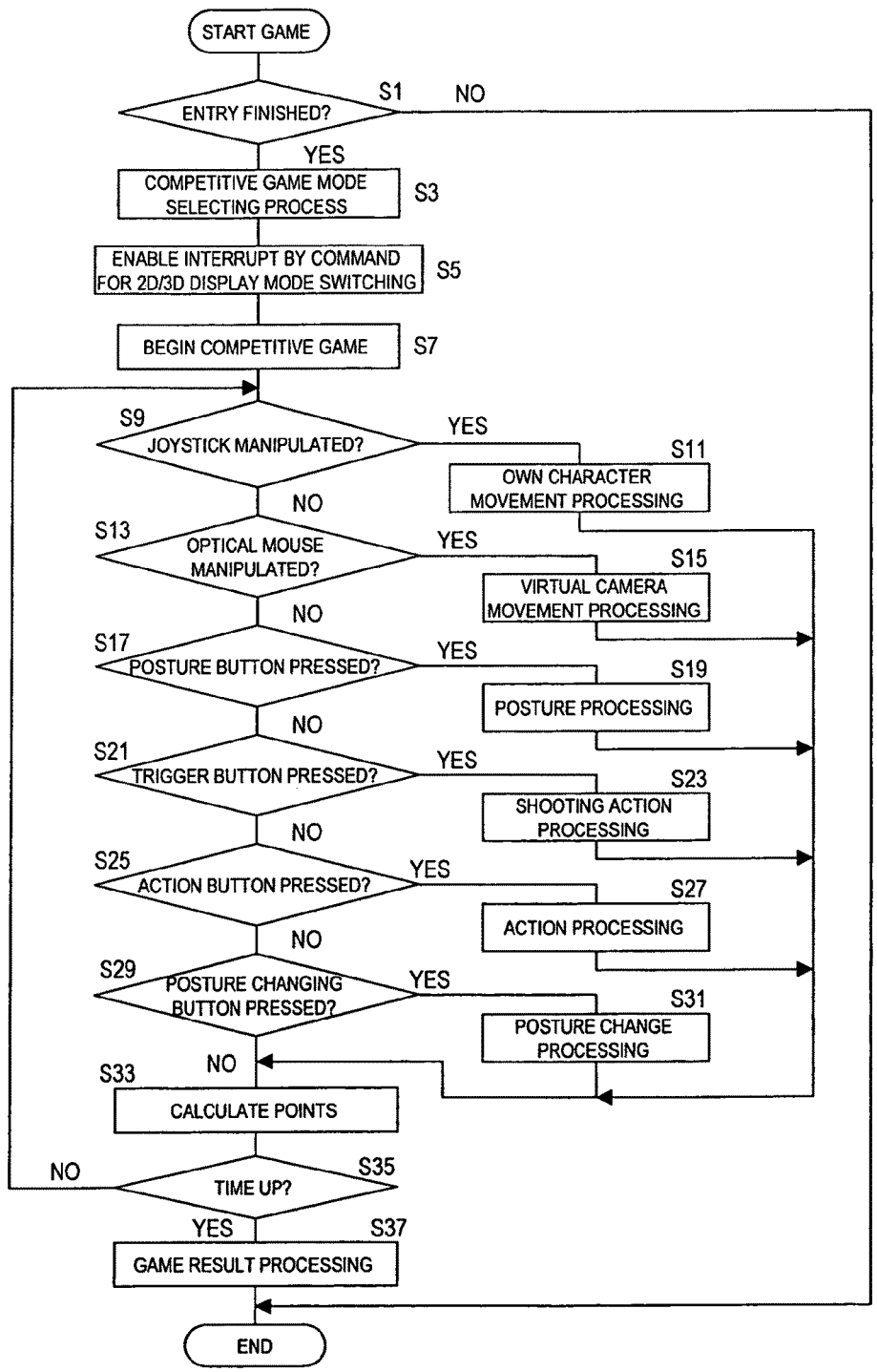
FIG. 24 is a flowchart illustrating a game processing procedure carried out by a central processing unit (CPU) of the gaming terminal according to a game program.

FIG. 24 is a flowchart illustrating a game processing procedure carried out by the CPU 161 of the gaming terminal 1 according to the game program. First, the CPU 161 judges whether an entry acceptance process has finished (step S1). If the entry acceptance process is judged unfinished yet (No in step S1), the CPU 161 exits the operational flow of FIG. 24. If the entry acceptance process is judged already finished (Yes in step S1), on the other hand, the CPU 161 performs a competitive game mode selecting process when a competitive game mode select button displayed on the monitor 11 is pressed, for example (step S3). Here, the monitor 11 may present on-screen options in the 3D display mode in step S3. As an example, the competitive game mode selecting process may initiate an operation for switching the on-screen presentation from the 2D display mode in which the two virtual cameras 60L, 60R overlap each other to the 3D display mode which gives a prescribed stereoscopic effect by changing the camera-to-camera distance in a stepwise fashion.

Upon completion of competitive game mode selection and other necessary settings, if any, in step S3, the gaming terminal 1 allows the player to play a competitive game. At this point in time the CPU 161 permits an interrupt by a command signal for switching the gaming terminal 1 between the 2D and 3D display mode (step S5). The player can now begin playing the game at the gaming terminal 1 (step S7).

From this time onward, the CPU 161 cyclically performs the below-described sequence (steps S9-S33) to proceed with the competitive game in this embodiment. Specifically, the CPU 161 judges whether the player has manipulated the joystick 41 (step S9). If the judgment result in step S9 is in the negative, the CPU 161 judges whether the player has manipulated the optical mouse 31 (step S13). If the judgment result in step S13 is in the negative, the CPU 161 judges whether the player has pressed the posture button 42 (step S17). If the judgment result in step S17 is in the negative, the CPU 161 judges whether the player has pressed the trigger button 32 (step S21). If the judgment result in step S21 is in the negative, the CPU 161 judges whether the player has pressed the action button 44 (step S25). If the judgment result in step S25 is in the negative, the CPU 161 judges whether the player has pressed the posture changing button 33 (step S29). Then, if the judgment result in step S29 is in the negative, the CPU 161 causes the point processor 161i to perform an operation for calculating points gained by the player (step S33). In a case where all of the judgment results in the aforementioned decision blocks (steps S9, S13, S17, S21, S25, S29) are in the negative, the CPU 161 passes the point calculating operation of step S33.

If the judgment results in the aforementioned decision blocks (steps S9, S13, S17, S21, S25, S29) are in the affirmative, the CPU 161 performs the below-described operations (steps S11, S15, S19, S23, S27, S31), respectively. Specifically, if the joystick 41 is judged to have been manipulated in step S9, the CPU 161 initiates an operation for processing movement of the player's own character (step S11). If the optical mouse 31 is judged to have been manipulated in step S13, the CPU 161 initiates an operation for moving the virtual cameras 60L, 60R (step S15). If the posture button 42 is judged to have been pressed in step S17, the CPU 161 initiates an operation for presenting an "over-the-shoulder" TPS image depicted in FIG. 15 or an FPS image as viewed generally from the muzzle position depicted in FIG. 16 (step S19). If the trigger button 32 is judged to have been pressed in step S21, the CPU 161 initiates an operation for performing a shooting action (step S23). Further, if the action button 44 is judged to have been pressed in step S25, the CPU 161 initiates an operation for causing the player's own character to perform a direct combat action (step S27). Additionally, if the posture changing button 33 is judged to have been pressed in step S29, the CPU 161 initiates an operation for changing the posture of the player's own character (step S31). The CPU 161 causes the point processor 161i to perform the point calculating operation (step S33) each time one of steps S11, S15, S19, S23, S27 and S31 described above has been carried out. The CPU 161 carries out each game by performing the above-described steps in accordance with the player's operations under the control of the game program.

Subsequently, the CPU 161 judges whether or not a "time up" situation has been reached after a lapse of a specific game playing time by use of an internal timer (not shown) (step S35). If the "time up" situation has not been reached yet, the CPU 161 returns to step S9. If the "time up" situation has already been reached, on the other hand, the CPU 161 switches the on-screen display from the 3D display mode to the 2D display mode in a stepwise fashion (in a case where the 3D display mode is currently selected) and then performs various game result processing operations such as on-screen presentation of points gained by the player and associated game results including the player's victory or defeat status (step S37). The CPU 161 finish the above-described game processing procedure at this point.

Figure 25:
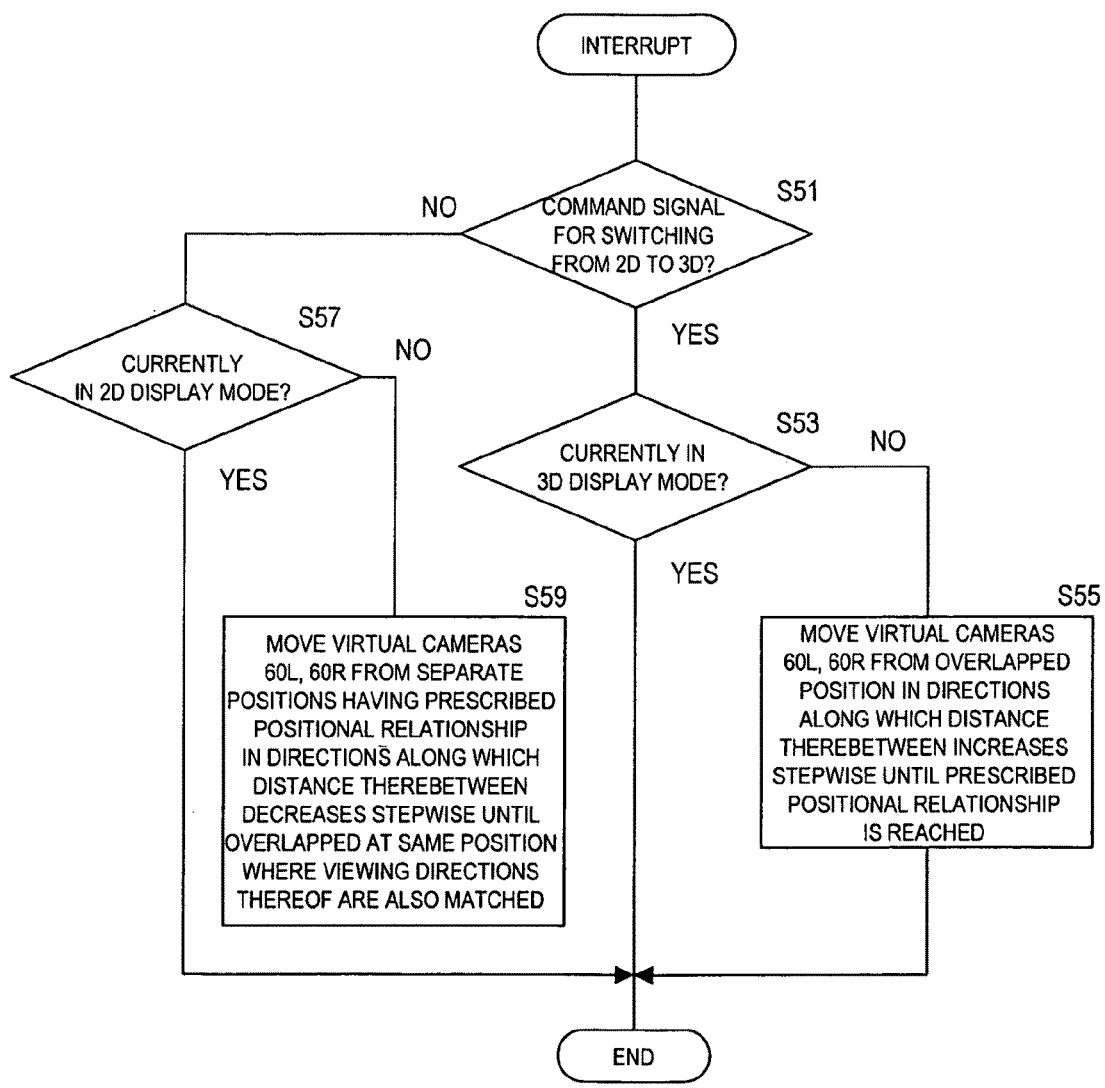
FIG. 25 is a flowchart illustrating an interrupt procedure carried out by the CPU of the gaming terminal according to the game program for switching between the 2D and 3D display modes at any time from the beginning to the end of a game.

FIG. 25 is a flowchart illustrating an interrupt procedure carried out by the CPU 161 of the gaming terminal 1 according to the game program for switching between the 2D and 3D display modes at any time from the beginning to the end of a game. First, the CPU 161 judges whether or not a command signal for display mode switching from the 2D display mode to the 3D display mode has been issued (step S51). If the judgment result in step S51 is in the affirmative, the CPU 161 judges whether the currently selected display mode is the 3D display mode (step S53). If the currently selected display mode is judged to be the 3D display mode (Yes in step S53), the CPU 161 exits the operational flow of FIG. 25. If the currently selected display mode is not the 3D display mode (No in step S53), on the other hand, the CPU 161 initiates an operation tor moving the virtual cameras 60L, 60R from a position where the two virtual cameras 60L, 60R overlap each other in directions along which the camera-to-camera distance increases in a stepwise fashion until these virtual cameras 60L, 60R are set at separate positions having a prescribed positional relationship therebetween (step S55).

If it is judged that a command signal for display mode switching from the 2D display mode to the 3D display mode has not been issued in step S51, the CPU 161 judges whether the currently selected display mode is the 2D display mode (step S57). If the currently selected display mode is judged to be the 2D display mode (Yes in step S57), the CPU 161 exits the operational flow of FIG. 25. If the currently selected display mode is not the 2D display mode (No in step S57), on the other hand, the CPU 161 initiates an operation for moving the virtual cameras 60L, 60R from separate positions having a prescribed positional relationship therebetween in directions along which the camera-to-camera distance decreases in a stepwise fashion until these virtual cameras 60L, 60R are finally set at the same position where the viewing directions thereof also coincide with each other (step S59).

The above-described stepwise display mode switching operation (which corresponds to the operation for moving the virtual cameras 60L, 60R) for switching the on-screen presentation between the 2D and 3D display modes depicted in FIGS. 24 and 25 is carried out in a way discussed below, for example. Upon receiving a command signal for display mode switching, the CPU 161 may perform an operation for successively repositioning the two virtual cameras 60L, 60R at predefined regular time intervals (counted by the internal timer) until a plurality of camera repositioning steps are completed, although contents of the multi-step, camera-to-camera distance information for stepwise virtual camera repositioning read out from the ROM 163 pre-storing the same may differ depending on whether the command signal is for switching the on-screen presentation from the 2D display mode to the 3D display mode, or vice versa. The mode switching speed during the aforementioned process of virtual camera repositioning can be adjusted stepwise by pre-storing camera-to-camera distances varying from one camera repositioning step to the next in the ROM 163 as in the illustrated examples of FIGS. 21, 22 and 23, for example. Alternatively, the mode switching speed during the virtual camera repositioning process may be adjusted stepwise by making differences in camera-to-camera distance from one repositioning step to the next unchanged but, conversely, by varying the duration of each successive time interval between one repositioning step and the next.

The above-described embodiment may be configured in such a manner that an interrupt by the command signal for display mode switching from the 2D display mode to the 3D display mode occurs under such conditions that the player has depressed the pushbutton setter 15 or the game in progress has reached any one of the situations depicted in FIGS. 11 to 17, for example.

While the invention has thus far been described with reference to the preferred embodiment and specific arrangements thereof, the aforementioned arrangements of the embodiment are simply illustrative and may be modified in various ways. Cited under (1) to (7) below are some examples of such modifications of the embodiment.

(1) While the foregoing embodiment employs the first and second control pads 30, 40 adapted to playing a competitive game like a shooting game, the arrangement including the first and second control pads 30, 40 has been described simply as an illustrative example. In fact, the present invention is applicable to various kinds of games performed in a virtual game space in which a virtual camera is allowed to move in the virtual game space during the progress of the game in accordance with manipulation by a player, for instance. The kinds of games to which the invention is applicable include a combat game, competitive games like baseball and football games, other competitive games like a time trial, a mahjong game, a breeding game in which a player tries to "breed" characters.

(2) While the foregoing embodiment requires glasses as an essential components, it is possible to eliminate the need for glasses by employing glasses-free stereoscopic (3D) viewing systems like the parallax panoramagram or lenticular system, for example.

(3) Although an image for on-screen presentation in the 2D display mode is generated by using the image storage blocks 162L, 162R of the RAM 162 in essentially the same way as for 3D image presentation in the 3D display mode in the foregoing embodiment, this arrangement may be modified to use only one of the image storage blocks 162L, 162R instead of both, and successively read out image data from each successive line of the specified one of the image storage blocks 162L, 162R and output the same to the monitor 11. According to this modified arrangement, it is possible to accomplish 2D image presentation by using only one of the two image storage blocks 162L, 162R.

(4) Although the foregoing embodiment employs such an arrangement that data on individual gaming images captured by the two virtual cameras 60L, 60R are once written in the image storage blocks 162L, 162R, this arrangement may be modified so as not to employ the image storage blocks 162L, 162R but directly write the gaming image data obtained with the virtual cameras 60L, 60R in the successive lines of the video RAM 162c in alternate turns. In this modified arrangement, the video RAM 162c serves the earlier-described function of the image storage blocks 162L, 162R as well. Additionally, although successive lines (rows) of the images captured for the left and right eyes are arranged alternately in the successive lines of the video RAM 162c in the foregoing embodiment, the images may be stored alternately in one column and another.

Moreover, the foregoing embodiment may be modified to employ an arrangement in which the image storage blocks 162L, 162R each have a storage capacity corresponding to one-half the number of pixels of the monitor 11 and the virtual cameras 60L, 60R each have the capability to capture an image containing pixels corresponding to the number of pixels of the monitor 11. To be more specific, the arrangement thus modified may be such that odd-numbered lines (rows) of image data are successively read out from an image captured by the virtual camera 60L and written in lines 1 through n of the image storage block 162L, whereas even-numbered lines (rows) of image data are successively read out from an image captured by the virtual camera 60R and written in lines 1 through n of the image storage block 162R and, further, the image data held in the image storage block 162L is read and written in odd-numbered lines of the video RAM 162c which has a total of 2n lines, whereas the image data held in the image storage block 162R is read and written in even-numbered lines of the video RAM 162c. In order to generate an on-screen image in the 3D display mode with as high a resolution as achieved in the 2D display mode, it is not necessarily needed to match the storage capacity of the image storage blocks 162L, 162R to a level corresponding to the number of pixels of the monitor 11 but it is possible to achieve the same level of resolution by a signal processing technique if only the image data captured by the virtual cameras 60L, 60R contain the same number of pixels as the monitor 11.

(5) Although switching between the 2D and 3D display modes need not necessarily be made in a stepwise fashion, it will be appreciated that the above-described arrangement for stepwise display mode switching serves to relieve the potential risk of stimulation of the player's eyes. Additionally, although intended primarily to provide an on-screen gaming image smoothly changing in a stepwise fashion in the event of switching between the 2D and 3D display modes in either direction, the foregoing embodiment may be modified such that stepwise display mode switching is performed only in the event of switching from the 2D display mode to the 3D display mode, taking into consideration the magnitude of stimulation of the player's eyes or brain caused by display mode switching.

(6) Furthermore, the foregoing embodiment may be modified to include only one virtual camera 60 that can serve as both the left and right virtual cameras 60L, 60R, wherein the virtual camera 60 is shifted in continual steps, preferably in alternate steps, and picks up images at individual positions so that the virtual camera 60L, or the virtual camera 60 located at a first virtual camera position, acquires first image data and the virtual camera 60R, or the virtual camera 60 located at a second virtual camera position, acquires second image data. This modified form of the embodiment may be accomplished by a method in which one virtual camera position is first specified and the other virtual camera position is specified next, or by a method in which a midpoint between the two virtual camera positions is first specified and left and right virtual camera positions are specified subsequently based on a prescribed distance of the virtual cameras 60L, 60R from the midpoint therebetween before capturing gaming images. It will be appreciated that this configuration helps simplify overall processing, requiring only one virtual camera.

(7) The above-described embodiment of the invention may employ an arrangement that makes it possible to adjust the level of three-dimensional (stereoscopic) effect by varying the distance between the two virtual camera positions, thereby providing an excitingly realistic gaming image which will produce less eye fatigue even if the player observes the on-screen image for a prolonged period of time. In order to implement such an arrangement, the setter 15 should preferably be made of a member suited for adjusting the level of stereoscopic effect (or stereopsis), such as a dial-type device. Specifically, as shown in FIG. 4, the control section 16 of the gaming terminal 1 includes a stereopsis level alteration processor 161n which issues a command for altering the positional relationship between the two virtual cameras 60L, 60R, or the distance therebetween, and executes a related operation upon receiving information concerning the player's manipulation of the setter 15.

Figure 26:
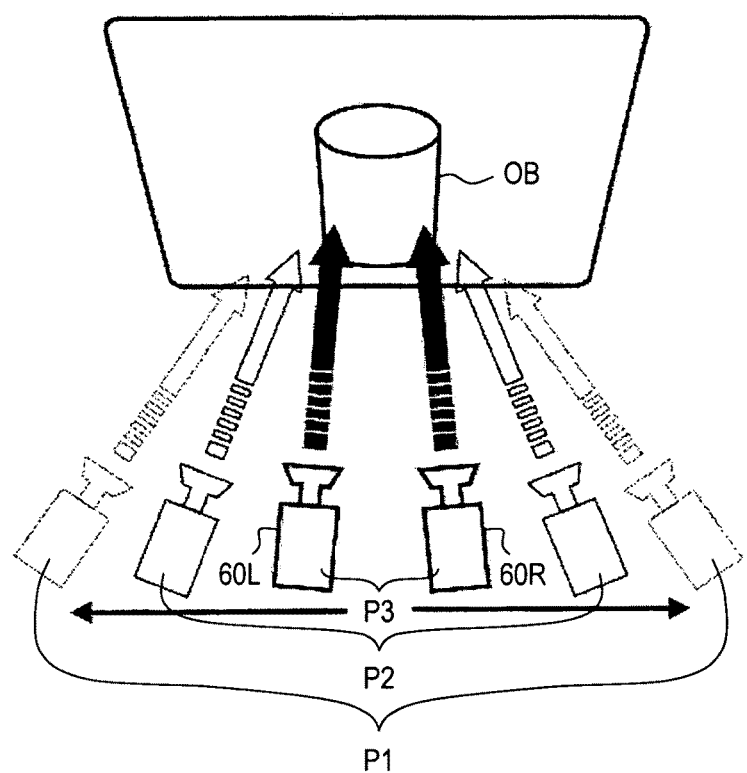
FIG. 26 is a diagram for explaining how the positional relationship between the two virtual cameras is varied.
Figure 27A:
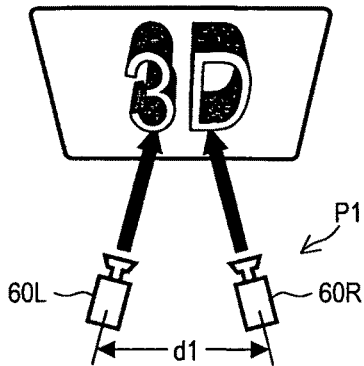
FIGS. 27A, 27B, 27C and 27D are diagrams depicting different positional relationships between the two virtual cameras and stereoscopic (3D) images, FIG. 27A depicting a state in which the two virtual cameras are set in positional relationship P1 with distance d1 therebetween, FIG. 27B depicting a state in which the two virtual cameras are set in positional relationship P2 with distance d2 therebetween, FIG. 27C depicting a state in which the two virtual cameras are set in positional relationship P3 with, distance d3 therebetween, and FIG. 27D depicting a state in which the two virtual cameras are set to overlap each other to have positional relationship P1.
Figure 27B:
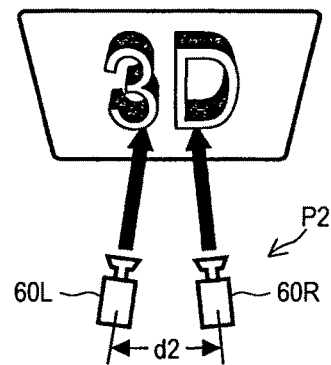
Figure 27C:
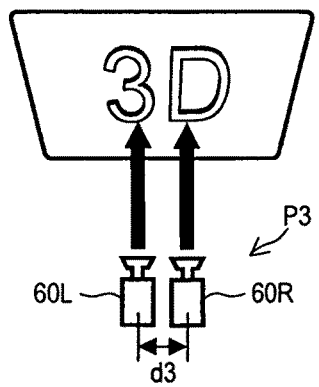
Figure 27D:
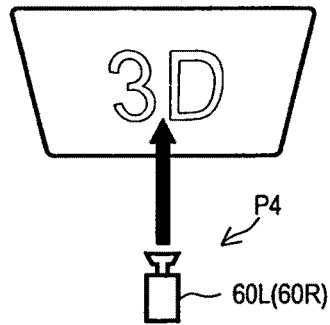

FIG. 26 is a diagram for explaining how the positional relationship between the two virtual cameras 60L, 60R is varied. FIGS. 27A, 27B, 27C and 27D are diagrams depicting different positional relationships between the two virtual cameras 60L, 60R and stereoscopic (3D) images, FIG. 27A depicting a state in which the two virtual cameras 60L, 60R are set in positional relationship P1 with distance d1 therebetween, FIG. 27B depicting a state in which the two virtual cameras 60L, 60R are set in positional relationship P2 with distance d2 therebetween, FIG. 27C depicting a state in which the two virtual cameras 60L, 60R are set in positional relationship P3 with distance d3 therebetween, and FIG. 27D depicting a state in which the two virtual cameras 60L, 60R are set to overlap each other to have positional relationship P4.

The 3D images depicted in FIGS. 27C, 27B and 27A have progressively higher levels of stereopsis in this order. On the other hand, FIG. 27D depicts a 2D image. While the viewing directions of the two virtual cameras 60L, 60R are set to intersect at a specific object OB or at a point located at a prescribed distance forward as illustrated in these Figures, the viewing directions of the two virtual cameras 60L, 60R may be set to align parallel to each other according to the present embodiment.

A decision on how much the two virtual cameras 60L, 60R should be separated from each other for 3D image presentation is related the level of stereopsis to be achieved and, therefore the virtual cameras 60L, 60R are set to have positional relationship P2 as depicted in FIG. 27B according to recommended values based on experimental or empirical knowledge concerning settings that produce less fatigue to human eyes. Positional relationship P3 depicted in FIG. 27C and positional relationship P1 depicted in FIG. 27A define camera positions close to camera positions recommended in positional relationship P2, taking into consideration the level of reality in stereoscopic feeling and differences in stereoscopic feeling among individuals.

The dial-type setter 15 may be configured with a conventionally known variable resistor that produces a voltage output corresponding to the amount of rotation. The rotary variable resistor employed in this embodiment is of a type which produces a tactile feedback (click) at four points along a rotating direction and outputs a position signal of which voltage level varies at these four points. The four click-generating points of the setter 15 correspond to positional relationship P4 to be established in the 2D display mode, positional relationship P3 to be established in the 3D display mode, positional relationship P2 to be established in the 3D display mode and positional relationship P1 to be established in the 3D display mode.

The stereopsis level alteration processor 161n detects the position signal output from the setter 15 and then executes an operation for establishing a positional relationship corresponding to the detected position signal between the two virtual cameras 60L, 60R. For example, if the dial-type setter 15 is turned from a rotational position corresponding to positional relationship P4 to a rotational position corresponding to positional relationship P2, for example, the two virtual cameras 60L, 60R are repositioned to establish positional relationship P2. Also, if the setter 15 is currently at the rotational position corresponding to positional relationship P2, where the 3D display mode is already selected, and turned from this rotational position to a rotational position corresponding to positional relationship P1, the two virtual cameras 60L, 60R are repositioned to establish positional relationship P1 so that there will be a substantial change in the level of stereopsis. On the contrary, if the setter 15 is currently at the rotational position corresponding to positional relationship P2, where the 3D display mode is selected, and turned from this rotational position a rotational position corresponding to positional relationship P3, the two virtual cameras 60L, 60R are repositioned to establish positional relationship P3 so that there will be a slight change in the level of stereopsis.

The ROM 163 of the gaming terminal 1 stores camera-to-camera distance information concerning the virtual cameras 60L, 60R in individual positional relationships P1, P2, P3, P4. Each time the player manipulates the setter 15, the stereopsis level alteration processor 161n reads out a corresponding piece of the camera-to-camera distance information concerning the virtual cameras 60L, 60R from the ROM 163 to thereby permit alteration of the level of stereopsis between the 2D and 3D display modes and in the 3D display mode. It should be noted that positional relationships that the player can select in the 3D display mode are not limited to 3-step positional relationships P1, P2 and P3 mentioned above but the choice of at least 2-step positional relationships P2 and P3 will suffice or, alternatively, the player may have a choice of any specified number (i.e., four or more) of stepwise positional relationships. Additionally, the setter 15 need not necessarily be of a rotary type but may be of a linear sliding type or may be structured with a joystick or a button having a plurality of selectable steps.

Figure 28:
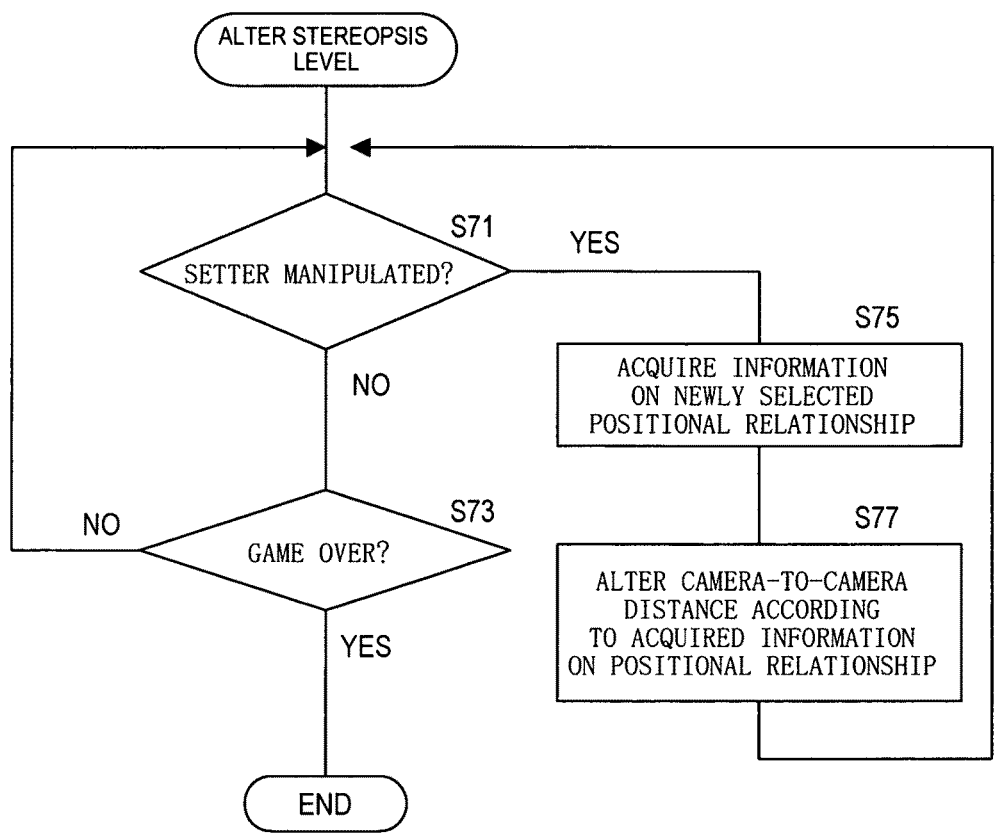
FIG. 28 is a flowchart illustrating an interrupt procedure carried out by the CPU of the gaming terminal according to the game program for altering the level of stereopsis between the 2D and 3D display modes and in the 3D display mode at any time from the beginning to the end of a game.

FIG. 28 is a flowchart illustrating an interrupt procedure carried out by the CPU 161 of the gaming terminal 1 according to the game program for altering the level of stereopsis between the 2D and 3D display modes and in the 3D display mode at any time from the beginning to the end of a game. First, the CPU 161 judges whether the setter 15 has been manipulated by checking the presence or absence of an output signal from the setter 15 (step S71). If it is judged that the setter 15 has not been manipulated, the CPU 161 judges whether the game has come to an end (step S73). If the game is judged to have not come to an end, the CPU 161 returns to step S71. If the game is judged to have come to an end, on the other hand, the CPU 161 finish the interrupt procedure of FIG. 28.

If it is judged that the setter 15 has been manipulated in step S71, the CPU 161 acquires information on a positional relationship between the two virtual cameras 60L, 60R newly selected by manipulation of the setter 15 (step S75). Subsequently, the CPU 161 initiates an operation for altering the distance between the two virtual cameras 60L, 60R according to the information on the newly selected positional relationship (step S77). At this point, the CPU 161 returns to step S71 and cyclically performs the above-described sequence (steps S71-S77) until the game is finished.

While the above-described arrangement of the embodiment permits alteration of the level of stereopsis between the 2D and 3D display modes and in the 3D display mode, this arrangement may be varied to enable alteration of the level of stereopsis only in the 3D display mode. An arrangement that enables switching operation in this way may include a toggling switch member for switching between the 2D and 3D display modes or the like and another member for switching the level of stereopsis among positional relationships P1, P2 and P3 only in the 3D display mode.

Furthermore, although the above-described arrangement of the embodiment employs the dial-type setter 15 which is rotated to selectively specify one of positional relationships P1, P2, P3, P4 between the two virtual cameras 60L, 60R, this arrangement may be varied to allow the player to select a desired positional relationship by means of a pushbutton-type, cyclically-acting switch member. Also, while the above-described arrangement offers a choice of three different positional relationships between the two virtual cameras 60L, 60R, the invention is not limited thereto but may employ other kinds of arrangements which make it possible to set the distance between the two virtual cameras 60L, 60R in substantially uninterrupted steps according to predefined relationships between changes in the output of the setter 15 and the distance between the two virtual cameras 60L, 60R, for example.

As described under (7) above, a video game machine according to a modification of the foregoing embodiment is configured to present a player with a gaming image captured by at least one virtual camera within a view angle in a viewing direction thereof, the at least one virtual camera forming a combination of first and second virtual cameras having a capability to move within a virtual game space in accordance with manipulation of an operating member by the player. This video game machine preferably comprises a monitor having a display screen on which a parallax barrier member that permits three-dimensional viewing is provided, a virtual camera controller for selectively providing on-screen presentation in 2D display mode with a positional relationship in which positions and viewing directions of the first and second virtual cameras for capturing images in the virtual game space are matched with each other and in 3D display mode in which the first and second virtual cameras are set to achieve a positional relationship with a prescribed distance therebetween in the virtual game space, an image display controller for temporarily storing first and second image data acquired by the first and second virtual cameras in first and second image storage blocks, respectively, generating the gaming image captured by the first and second virtual cameras by using the image data obtained from the first and second image storage blocks one line after another and then outputting the gaming image thus generated to the monitor, and a stereopsis level alteration processor which receives information on manipulation of a stereopsis setter by the player and issues a command for altering the distance between the first and second virtual cameras when the 3D display mode is selected.

As described also under (7) above, a gaming image display control method is for a video game machine which includes a monitor having a display screen on which a parallax barrier member that permits three-dimensional viewing is provided, the video game machine being configured to present on the monitor a gaming image captured by at least one virtual camera within a view angle in a viewing direction thereof, wherein the at least one virtual camera forms a combination of first and second virtual cameras having a capability to move within a virtual game space in accordance with manipulation of an operating member by the player. This gaming image display control method preferably comprises a virtual camera control step of selectively providing on-screen presentation in 2D display mode with a positional relationship in which positions and viewing directions of the first and second virtual cameras for capturing images in the virtual game space are matched with each other and in 3D display mode in which the first and second virtual cameras are set to achieve a positional relationship with a prescribed distance therebetween in the virtual game space, an image display control step of temporarily storing first and second image data acquired by the first and second virtual cameras in first and second image storage blocks, respectively, generating the gaming image captured by the first and second virtual cameras by using the image data obtained from the first and second image storage blocks one line after another and then outputting the gaming image thus generated to the monitor, and a stereopsis level alteration step of issuing a command for altering the distance between the first and second virtual cameras upon receiving information on manipulation of a stereopsis setter by the player when the 3D display mode is selected.

According to the above-described features of the modified embodiment of the invention, the parallax barrier member that permits three-dimensional viewing is provided on the display screen of the monitor and this allows the player to observe the gaming image with three-dimensional reality. Each of the virtual cameras moves within the virtual game space in accordance with manipulation of the operating member by the player. The gaming image captured by each virtual camera within the view angle in the viewing direction thereof is presented on the monitor for the player, enabling the player to manipulate the operating member while observing the on-screen gaming image. While the game is in progress, the virtual camera controller makes it possible to provide the on-screen presentation selectively in the 2D display mode with a positional relationship in which the positions and viewing directions of the first and second virtual cameras for capturing images in the virtual game space are matched with each other and in the 3D display mode in which the first and second virtual cameras are set to achieve a positional relationship with a prescribed distance therebetween in the virtual game space in accordance with manipulation of the operating member by the player. Consequently, the image display controller temporarily stores the first and second image data acquired by the first and second virtual cameras in the first and second image storage blocks, respectively, generates the gaming image captured by the first and second virtual cameras by using pixel data stored in the first and second image storage blocks one line after another while maintaining a specific level of resolution regardless of whether the 2D or 3D display mode is selected, and then outputs the gaming image thus generated to the monitor. Upon receiving information on manipulation of the stereopsis setter, the stereopsis level alteration processor alters the positional relationship between the first and second virtual cameras so that the distance therebetween varies from the aforementioned prescribed distance to a different distance, such as in a direction in which the camera-to-camera distance becomes larger or smaller. Since the distance between the first and second virtual cameras is increased or decreased consequently, the level of stereoscopic effect (or stereopsis) is altered correspondingly. Specifically, the level of stereopsis increases if the camera-to-camera distance is increased and, on the contrary, the level of stereopsis decreases if the camera-to-camera distance is decreased. It can be appreciated that the stereopsis level alteration processor makes it possible adjust the level of reality in stereoscopic feeling and provide a gaming image which will produce less eye fatigue even if the player observes the on-screen image for a prolonged period of time.

It is also preferable that the aforementioned stereopsis level alteration processor be configured to have a capability to alter the camera-to-camera distance in a plurality of steps. This arrangement will make it possible to quickly switch the distance between the first and second virtual cameras to one of the plurality of steps, so that the player can easily reposition the two virtual cameras to have a camera-to-camera distance suitable for producing a desired level of stereoscopic effect.

It is also preferable to adopt such an arrangement that the stereopsis level alteration processor cyclically alters the camera-to-camera distance each time the aforementioned stereopsis setter is operated. This arrangement will facilitate operation for altering the stereopsis level.

Still preferably, the stereopsis setter employs a device which outputs a continually changing signal and the stereopsis level alteration processor sets the camera-to-camera distance according to the output signal of the stereopsis setter. In this arrangement, it will be possible to vary the camera-to-camera distance in substantially uninterrupted steps, allowing the player to easily set a desired level of stereoscopic effect.

Yet preferably, the stereopsis level alteration processor has a capability to set camera-to-camera distances including a zero distance. This will make it possible to switch the on-screen presentation to a zero level of stereoscopic effect, which is produced in the 2D display mode, by the same operating procedure.

As can be summarized from the above, a video game machine of the invention is configured to present a player with an image captured by at least one virtual camera within a view angle in a viewing direction thereof, the at least one virtual camera forming a combination of first and second virtual cameras having a capability to move within a virtual game space in accordance with manipulation of an operating member by the player. This video game machine preferably comprises a monitor having a display screen on which a parallax barrier member that permits three-dimensional viewing is provided, a virtual camera controller for selectively providing on-screen presentation in 2D display mode in which positions and viewing directions of the first and second virtual cameras for capturing images in the virtual game space are matched with each other and in 3D display mode in which the first and second virtual cameras are set at different positions with a prescribed relationship therebetween and with prescribed viewing directions intersecting each other in the virtual game space, first and second image storage blocks for temporarily storing first and second image data acquired by the first and second virtual cameras, respectively, a display mode specifier for selectively specifying one of the 2D and 3D display modes, and an image display controller for generating an image for 3D display by using the image data obtained from the first and second image storage blocks one line after another and then outputting the image thus generated to the monitor.

According to the above-described feature of the invention, each of the virtual cameras moves within the virtual game space in accordance with manipulation of the operating member by the player. The gaming image captured by each virtual camera within the view angle in the viewing direction thereof is presented on the monitor for the player, enabling the player to manipulate the operating member while observing the on-screen gaming image. Since the parallax barrier member that permits three-dimensional viewing is provided on the display screen of the monitor, the player is allowed to play a game with fun while observing the gaming image presented on the monitor with a stereoscopic effect. While the game is in progress, the virtual camera controller makes it possible to provide the on-screen presentation selectively in the 2D display mode in which the positions and viewing directions of the first and second virtual cameras are matched with each other in the virtual game space and in the 3D display mode in which the first and second virtual cameras are set at different positions with a prescribed relationship therebetween and with prescribed viewing directions intersecting each other in the virtual game space. The first and second virtual cameras may each have the same number of pixels as the monitor for capturing the gaming image. The first and second image data acquired by the first and second virtual cameras are temporarily written in the first and second image storage blocks, respectively. Meanwhile, the 2D and 3D display modes are selectively specified by the aforementioned display mode specifier. When one of the 2D and 3D display modes is specified according to a command given to the display mode specifier, the image display controller selectively generates an image for 2D display or an image for 3D display by using pixel data obtained from the first and second image storage blocks one line after another and outputs the image thus generated to the monitor. An image for 2D display or 3D display is selectively generated based on gaming images for left and right eyes captured by the two virtual cameras and presented for the player according to his or her choice by preference, thus providing the player with a gaming image featuring great reality depending on situations in the game.

In one aspect of the invention, the video game machine is preferably so configured that the image display controller generates images for 2D and 3D displays by performing the same operation in reading out the image data from the first and second image storage blocks in either of the 2D and 3D display modes. According to this configuration, it is possible to accomplish on-screen image presentation in both the 2D and 3D display modes by simply establishing a positional relationship between the two virtual cameras, contributing thereby to reducing a processing burden.

In another aspect of the invention, the video game machine is preferably so configured that the virtual camera controller sets the first and second virtual cameras at positions separated by a prescribed distance from each other, and the operating member specifies the positions of the first and second virtual cameras as if the first and second virtual cameras together constitute a single entity in the 3D display mode. According to this configuration, it becomes possible for the player to move the virtual cameras in the virtual game space by simply manipulating the operating member. As the positions of the two virtual cameras are correlated in advance in this case, it is possible to move the two virtual cameras as a single entity (in substantially the same way as in the case of moving a single virtual camera), contributing thereby to improving operability.

In another aspect of the invention, the video game machine is preferably so configured that the operating member specifies one of either position of the first and second virtual cameras and a midpoint of the prescribed camera-to-camera distance in the 3D display mode. According to this configuration, once the player specifies a single position in the virtual game space, it is possible to reposition, or move, the two virtual cameras with reference to the specified single position, thereby facilitating operation for positioning the two virtual cameras.

In another aspect of the invention, the video game machine is preferably so configured that the aforementioned at least one virtual camera is a single virtual camera which serves as the first virtual camera to acquire the first image data when located at the first virtual camera position and as the second virtual camera to acquire the second image data when located at the second virtual camera position. This configuration may employ a method in which the position of one virtual camera is first determined and then the position of the other virtual camera is determined or a method in which the midpoint between the positions of the two virtual cameras is first determined and then the positions of the left and right virtual cameras are determined based on a prescribed distance of the two virtual cameras from the midpoint therebetween before capturing gaming images. This configuration helps simplify overall processing, requiring only one virtual camera.

In another aspect of the invention, the video game machine further comprises a pair of glasses used by the player, wherein the parallax barrier member is one of a sheetlike member and a thin platelike member to which strips of polarizers whose polarizing direction varies at intervals of a specific number of lines are attached and the pair of glasses has left and right glasses to which polarizers having different polarizing directions are attached. According to this configuration, the player is allowed to watch gaming images in either of the 2D and 3D display modes while wearing the pair of glasses, thus eliminating the need for putting on and off the pair of glasses each time the display mode is switched.

In another aspect of the invention, the video game machine is preferably so configured that the display mode specifier includes a button located at an appropriate position in front of the display screen of the monitor. According to this configuration, the button used for specifying a desired display mode is located close to the display screen of the monitor, and this allows the player, and any person near the player, to recognize the player's manipulation for switching the display mode and feel or experience dynamic changes in the gaming image presented on-screen resulting from the switching to the 3D display mode.

In another aspect of the invention, the video game machine is preferably so configured that the display mode specifier issues a command for switching from the 2D display mode to the 3D display mode when the game currently in progress reaches a prescribed situation. According to this configuration, the display mode specifier automatically switches the on-screen gaming image to the 3D display mode in a scene where it is desirable to create true-to-life reality, thereby permitting the player to play the game with more fun.

In another aspect of the invention, the video game machine is preferably so configured that the display mode specifier issues a command for switching from the 3D display mode to the 2D display mode when the game currently in progress recovers from the aforementioned prescribed situation. According to this configuration, the on-screen gaming image automatically returns to the 2D display mode, thereby protecting the player from excessive eye fatigue.

According to another important feature of the invention, a video game machine is configured to present a player with a gaming image captured by at least one virtual camera within a view angle in a viewing direction thereof, the at least one virtual camera forming a combination of first and second virtual cameras having a capability to move within a virtual game space in accordance with manipulation of an operating member by the player. This video game machine comprises a monitor having a display screen on which a parallax barrier member that permits three-dimensional viewing is provided, a virtual camera controller for selectively providing on-screen presentation in 2D display mode with a positional relationship in which positions and viewing directions of the first and second virtual cameras for capturing images in the virtual game space are matched with each other and in 3D display mode in which the first and second virtual cameras are set to achieve a positional relationship with a prescribed distance therebetween in the virtual game space, an image display controller for temporarily storing first and second image data acquired by the first and second virtual cameras in first and second image storage blocks, respectively, generating the gaming image captured by the first and second virtual cameras by using the image data obtained from the first and second image storage blocks one line after another and then outputting the gaming image thus generated to the monitor, a display mode specifier for selectively specifying one of the 2D and 3D display modes, and a display mode switching processor for repositioning the first and second virtual cameras from positions satisfying the positional relationship in one of the display modes to positions satisfying the positional relationship in the other of the display modes in a stepwise fashion according to a command given by the display mode specifier.

In the video game machine of the invention thus configured, the parallax barrier member that permits three-dimensional viewing is provided on the display screen of the monitor and this allows the player to observe the gaming image with three-dimensional reality. Each of the virtual cameras moves within the virtual game space in accordance with manipulation of the operating member by the player. The gaming image captured by each virtual camera within the view angle in the viewing direction thereof is presented on the monitor for the player, enabling the player to manipulate the operating member while observing the on-screen gaming image. While the game is in progress, the virtual camera controller makes it possible to provide the on-screen presentation selectively in the 2D display mode with a positional relationship in which the positions and viewing directions of the first and second virtual cameras for capturing images in the virtual game space are matched with each other and in the 3D display mode in which the first and second virtual cameras are set to achieve a positional relationship with a prescribed distance therebetween in the virtual game space in accordance with manipulation of the operating member by the player. Consequently, the image display controller temporarily stores the first and second image data acquired by the first and second virtual cameras in the first and second image storage blocks, respectively, generates the gaming image captured by the first and second virtual cameras by using pixel data stored in the first and second image storage blocks one line after another while maintaining a specific level of resolution, and then outputs the gaming image thus generated to the monitor.

When the display mode specifier selectively specifies one of the 2D and 3D display modes, the display mode switching processor repositions the first and second virtual cameras from positions satisfying the positional relationship in one of the display modes to positions satisfying the positional relationship in the other of the display modes in a stepwise fashion. Therefore, the video game machine is shifted from one display mode to the other as a result of stepwise repositioning of the first and second virtual cameras accomplished by cooperative operation of the virtual camera controller and the image display controller. The display mode is switched in a stepwise fashion as mentioned above, and this serves to suppress stimulation of the player's brain caused by sudden changes from a state in which the on-screen gaming image produces no stereoscopic effect to a state in which the on-screen gaming image produces a stereoscopic effect, and vice versa.

In another aspect of the invention, the video game machine is preferably so configured that the virtual camera controller sets the first and second virtual cameras to have prescribed viewing directions intersecting each other in the 3D display mode. This configuration serves to create a stereoscopic effect for specific objects or distances in the virtual game space, thereby providing a more natural 3D image presentation.

In another aspect of the invention, the video game machine is preferably so configured that the display mode switching processor varies a moving speed of the first and second virtual cameras with the lapse of time during a process of stepwise switching of the positional relationship between the first and second virtual cameras. According to this configuration, the moving speed of the first and second virtual cameras is varied with the lapse of time when the display mode is switched. This makes it possible to variably control the camera moving speed in a way that alleviates stimulation of the player's eyes or brain.

In another aspect of the invention, the video game machine is preferably so configured that the moving speed of the first and second virtual cameras is made higher in an initial stage of the display mode switching process than in a final stage thereof. This configuration makes it possible to reduce the camera moving speed in the final stage of the switching process to alleviate stimulation of the player's eyes or brain, especially when the display mode is finally switched to the 3D display mode. Meanwhile, this configuration includes an arrangement in which the camera moving speed is reduced in gradual steps.

In another aspect of the invention, the video game machine is preferably so configured that the moving speed of the first and second virtual cameras is made lower in an initial stage of the display mode switching process than in a final stage thereof. This configuration makes it possible to reduce the camera moving speed in the beginning of the switching process to alleviate stimulation of the player's eyes or brain, especially when the display mode is finally switched to the 2D display mode. Meanwhile, this configuration includes an arrangement in which the camera moving speed is increased in gradual steps.

In another aspect of the invention, the video game machine is preferably so configured that the moving speed of the first and second virtual cameras is made lower in a middle stage of the display mode switching process than in initial and final stages thereof. This configuration allows the player's eyes to become accustomed to changes in the middle stage of the display mode switching process, thereby alleviating the stimulation.

In another aspect of the invention, the video game machine is preferably so configured that the moving speed of the first and second virtual cameras is varied in different ways depending on whether the on-screen presentation is switched from the 2D display mode to the 3D display mode, or vice versa. This configuration makes it possible to select a desired moving speed of the first and second virtual cameras depending on whether the on-screen presentation is switched from the 2D display mode to the 3D display mode, or vice versa.

In still another aspect of the invention, the video game machine is preferably so configured that the display mode switching processor keeps the viewing directions of the first and second virtual cameras parallel to each other during a process of stepwise switching of the positional relationship between the first and second virtual cameras. This configuration serves to create a generally uniform level of stereoscopic effect all the way along a depthwise direction.

In yet another aspect of the invention, the video game machine is preferably so configured that the display mode switching processor keeps the first and second virtual cameras in viewing directions along which the virtual cameras are aimed toward a specified point in the virtual game space. According to this configuration, the video game machine creates a stereoscopic image centered around a particular object or the specified point in the virtual game space. For this reason, a subject requiring particular attention exists in the middle of the gaming image displayed on-screen and this serves to lower the level of stimulation.

What is claimed is:

1. A video game machine configured to present a player with an image captured by at least one virtual camera within a view angle in a viewing direction thereof, said at least one virtual camera forming a combination of first and second virtual cameras having a capability to move within a virtual game space in accordance with manipulation of an operating member by the player, said video game machine comprising:
    a monitor having a display screen on which a parallax barrier member that permits three-dimensional viewing is provided;
    a virtual camera controller for selectively providing on-screen presentation in 2D display mode in which positions and viewing directions of said first and second virtual cameras for capturing images in the virtual game space are matched with each other and in 3D display mode in which said first and second virtual cameras are set at different positions with a prescribed relationship therebetween and with prescribed viewing directions intersecting each other in the virtual game space;
    first and second image storage blocks for temporarily storing first and second image data acquired by said first and second virtual cameras, respectively;
    a display mode specifier for selectively specifying one of the 2D and 3D display modes; and
    an image display controller for generating an image for 3D display by using the image data obtained from said first and second image storage blocks one line after another and then outputting the image thus generated to said monitor.

2. The video game machine according to claim 1, wherein said image display controller generates images for 2D and 3D displays by performing the same operation in reading out the image data from said first and second image storage blocks in either of the 2D and 3D display modes.

3. The video game machine according to claim 1, wherein said virtual camera controller sets said first and second virtual cameras at positions separated by a prescribed distance from each other, and said operating member specifies the positions of said first and second virtual cameras as if said first and second virtual cameras together constitute a single entity in the 3D display mode.

4. The video game machine according to claim 3, wherein said operating member specifies one of either position of said first and second virtual cameras and a midpoint of said prescribed camera-to-camera distance in the 3D display mode.

5. The video game machine according to claim 1, wherein said at least one virtual camera is a single virtual camera which serves as said first virtual camera to acquire the first image data when located at the first virtual camera position and as said second virtual camera to acquire the second image data when located at the second virtual camera position.

6. The video game machine according to claim 1 further comprising a pair of glasses used by the player, wherein said parallax barrier member is one of a sheetlike member and a thin platelike member to which strips of polarizers whose polarizing direction varies at intervals of a specific number of lines are attached and said pair of glasses has left and right glasses to which polarizers having different polarizing directions are attached.

7. The video game machine according to claim 1, wherein said display mode specifier includes a button located at an appropriate position in front of the display screen of said monitor.

8. The video game machine according to claim 1, wherein said display mode specifier issues a command for switching from the 2D display mode to the 3D display mode when the game currently in progress reaches a prescribed situation.

9. The video game machine according to claim 8, wherein said display mode specifier issues a command for switching from the 3D display mode to the 2D display mode when the game currently in progress recovers from said prescribed situation.

10. A gaming image display control method for a video game machine which includes a monitor having a display screen on which a parallax barrier member that permits three-dimensional viewing is provided, said video game machine being configured to present on said monitor a gaming image captured by at least one virtual camera within a view angle in a viewing direction thereof, said at least one virtual camera forming a combination of first and second virtual cameras having a capability to move within a virtual game space in accordance with manipulation of an operating member by the player, said gaming image display control method comprising:

a display mode specifying step of selectively specifying one of 2D display mode and 3D display mode;

a virtual camera control step of selectively providing on-screen presentation in the 2D display mode in which positions and viewing directions of said first and second virtual cameras for capturing images in the virtual game space are matched with each other and in the 3D display mode in which said first and second virtual cameras are set at different positions with a prescribed relationship therebetween and with prescribed viewing directions intersecting each other in the virtual game space according to a command given in said display mode specifying step;

a step of temporarily storing first and second image data acquired by said first and second virtual cameras in first and second image storage blocks, respectively; and an image display control step of generating an image for 3D display by using the image data obtained from said first and second image storage blocks one line after another and then outputting the image thus generated to said monitor according to the command given in said display mode specifying step.

11. A video game machine configured to present a player with a gaming image captured by at least one virtual camera within a view angle in a viewing direction thereof, said at least one virtual camera forming a combination of first and second virtual cameras having a capability to move within a virtual game space in accordance with manipulation of an operating member by the player, said video game machine comprising:

a monitor having a display screen on which a parallax barrier member that permits three-dimensional viewing is provided;

a virtual camera controller for selectively providing on-screen presentation in 2D display mode with a positional relationship in which positions and viewing directions of said first and second virtual cameras for capturing images in the virtual game space are matched with each other and in 3D display mode in which said first and second virtual cameras are set to achieve a positional relationship with a prescribed distance therebetween in the virtual game space;

an image display controller for temporarily storing first and second image data acquired by said first and second virtual cameras in first and second image storage blocks, respectively, generating the gaming image captured by said first and second virtual cameras by using the image data obtained from said first and second image storage blocks one line after another and then outputting the gaming image thus generated to said monitor;

a display mode specifier for selectively specifying one of the 2D and 3D display modes; and a display mode switching processor for repositioning said first and second virtual cameras from positions satisfying the positional relationship in one of the display modes to positions satisfying the positional relationship in the other of the display modes in a stepwise fashion according to a command given by said display mode specifier.

12. The video game machine according to claim 11, wherein said virtual camera controller sets said first and second virtual cameras to have prescribed viewing directions intersecting each other in the 3D display mode.

13. The video game machine according to claim 11, wherein said display mode switching processor varies a moving speed of said first and second virtual cameras with the lapse of time during a process of stepwise switching of the positional relationship between said first and second virtual cameras.

14. The video game machine according to claim 13, wherein the moving speed of said first and second virtual cameras is made higher in an initial stage of the switching process than in a final stage thereof.

15. The video game machine according to claim 13, wherein the moving speed of said first and second virtual cameras is made lower in an initial stage of the switching process than in a final stage thereof.

16. The video game machine according to claim 13, wherein the moving speed of said first and second virtual cameras is made lower in a middle stage of the switching process than in initial and final stages thereof.

17. The video game machine according to claim 13, wherein the moving speed of said first and second virtual cameras is varied in different ways depending on whether the on-screen presentation is switched from the 2D display mode to the 3D display mode, or vice versa.

18. The video game machine according to claim 11, wherein said display mode switching processor keeps the viewing directions of said first and second virtual cameras parallel to each other during a process of stepwise switching of the positional relationship between said first and second virtual cameras.

19. The video game machine according to claim 11, wherein said display mode switching processor keeps said first and second virtual cameras in viewing directions along which said virtual cameras are aimed toward a specified point in the virtual game space.

20. A gaming image display control method for a video game machine which includes a monitor having a display screen on which a parallax barrier member that permits three-dimensional viewing is provided, said video game machine being configured to present on said monitor a gaming image captured by at least one virtual camera within a view angle in a viewing direction thereof, said at least one virtual camera forming a combination of first and second virtual cameras having a capability to move within a virtual game space in accordance with manipulation of an operating member by the player, said gaming image display control method comprising:

a virtual camera control step of selectively providing on-screen presentation in 2D display mode with a positional relationship in which positions and viewing directions of said first and second virtual cameras for capturing images in the virtual game space are matched with each other and in 3D display mode in which said first and second virtual cameras are set to achieve a positional relationship with a prescribed distance therebetween in the virtual game space;

an image display control step of temporarily storing first and second image data acquired by said first and second virtual cameras in first and second image storage blocks, respectively, generating the gaming image captured by said first and second virtual cameras by using the image data obtained from said first and second image storage blocks one line after another and then outputting the gaming image thus generated to said monitor;

a display mode specifying step of selectively specifying one of the 2D and 3D display modes; and a display mode switching processing step of repositioning said first and second virtual cameras from positions satisfying the positional relationship in one of the display modes to positions satisfying the positional relationship in the other of the display modes in a stepwise fashion according to a command given in said display mode specifying step.

* * * * *